US012776121B2

(12) United States Patent
Cai et al.

(10) Patent No.: US 12,776,121 B2
(45) Date of Patent: Oct. 27, 2026

(54) SAMPLE-ADAPTIVE 3D FEATURE CALIBRATION AND ASSOCIATION AGENT

(71) Applicant: Intel Corporation, Santa Clara, CA (US)

(72) Inventors: Dongqi Cai, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 18/572,351

(22) PCT Filed: Oct. 13, 2021

(86) PCT No.: PCT/CN2021/123421
§ 371 (c)(1),
(2) Date: Dec. 20, 2023

(87) PCT Pub. No.: WO2023/060459
PCT Pub. Date: Apr. 20, 2023

(65) Prior Publication Data

US 2024/0296650 A1 Sep. 5, 2024

(51) Int. Cl.
*G06V 10/44* (2022.01)
*G06V 10/771* (2022.01)
*G06V 10/82* (2022.01)

(52) U.S. Cl.
CPC ............ *G06V 10/44* (2022.01); *G06V 10/771* (2022.01); *G06V 10/82* (2022.01)

(58) Field of Classification Search
CPC ...... G06V 10/44; G06V 10/771; G06V 10/82; G06N 3/0442; G06N 3/0464; G06N 3/048; G06N 3/09
(Continued)

(56) References Cited

U.S. PATENT DOCUMENTS

2019/0042927 A1 2/2019 Keskin et al.
2020/0327367 A1 10/2020 Ma et al.
(Continued)

FOREIGN PATENT DOCUMENTS

CN 107203134 A 9/2017
CN 107944488 A 4/2018
(Continued)

OTHER PUBLICATIONS

Z. Qiu et al., "Learning Spatio-Temporal Representation with Pseudo-3D Residual Networks", International Conference on Computer Vision 2017, Oct. 1, 2017, pp. 5533-5541.
(Continued)

*Primary Examiner* — Charlotte M Baker
(74) *Attorney, Agent, or Firm* — Nicholson De Vos Webster & Elliott LLP

(57) ABSTRACT

Technology to conduct image sequence/video analysis can include a processor, and a memory coupled to the processor, the memory storing a neural network, the neural network comprising a plurality of convolution layers, a network depth relay structure comprising a plurality of network depth calibration layers, where each network depth calibration layer is coupled to an output of a respective one of the plurality of convolution layers, and a feature dimension relay structure comprising a plurality of feature dimension calibration slices, where the feature dimension relay structure is coupled to an output of another layer of the plurality of convolution layers. Each network depth calibration layer is coupled to a preceding network depth calibration layer via first hidden state and cell state signals, and each feature dimension calibration slice is coupled to a preceding feature dimension calibration slice via second hidden state and cell state signals.

25 Claims, 17 Drawing Sheets

500

(58) Field of Classification Search
USPC .......................................................... 382/190
See application file for complete search history.

(56) References Cited

U.S. PATENT DOCUMENTS

| | | | |
|---|---|---|---|
| 2021/0158010 | A1 | 5/2021 | Chang et al. |
| 2021/0158023 | A1 | 5/2021 | Fu et al. |
| 2021/0264188 | A1 | 8/2021 | Matsumura et al. |
| 2024/0296668 | A1 | 9/2024 | Cai et al. |

FOREIGN PATENT DOCUMENTS

| | | | | | |
|---|---|---|---|---|---|
| CN | 109154990 | A | | 1/2019 | |
| CN | 110070503 | A | | 7/2019 | |
| CN | 110096940 | A | | 8/2019 | |
| CN | 110858324 | A | | 3/2020 | |
| CN | 112529165 | A | | 3/2021 | |
| CN | 113052254 | A | | 6/2021 | |
| CN | 113221620 | A | | 8/2021 | |
| CN | 113326748 | A | | 8/2021 | |
| CN | 110728200 | B | * | 6/2023 | ............ G06N 3/045 |
| WO | 2023035221 | A1 | | 3/2023 | |
| WO | 2023060459 | A1 | | 4/2023 | |

OTHER PUBLICATIONS

Y Zou et al., "Learning Representational Invariances for Data-Efficient Action Recognition", Computer Vision and Image Understanding, arXiv:2103.16565V3, Nov. 18, 2022, 15 pages.
Y. Wu et al., "Group Normalization", arXiv:1803.08494v3, Jun. 11, 2018, 10 pages.
X. Li et al., "SmallBigNet: Integrating Core and Contextual Views for Video Classification", arXiv:2006.14582v1, Jun. 25, 2020, 10 pages.
S. Xie et al., "Rethinking Spatiotemporal Feature Learning: Speed-Accuracy Trade-Offs in Video Classification", arXiv:1712.04851v2, Jul. 27, 2018, 17 pages.
S, Ioffe et al., Batch Normalization: Accelerating Deep Network Training By Reducing Internal Covariate Shift, arXiv:1502.03167v3, Mar. 2, 2015, 11 pages.
S. Lin et al., "Human Action Recognition using Factorized Spatio-Temporal Convolutional Networks", arXiv:1510.00562v1, Oct. 2, 2015, 9 pages.
J. Lei Ba et al., "Layer Normalization", arXiv:1607.06450v1, Jul. 21, 2016, 14 pages.
J. Carreira et al., "Quo Vadis, Action Recognition? A New Model and the Kinetics Dataset", arXiv:1705.07750v3, Feb. 12, 2018, 10 pages.
D. Tran et al., "Learning Spatiotemporal Features with 3D Convolutional Networks", arXiv:1412.0767v4, Oct. 7, 2015, 16 pages.
D. Ulyanov et al., "Instance Normalization: The Missing Ingredient for Fast Stylization", arXiv:1607.08022v3, Nov. 6, 2017, 6 pages.
D. Tran et al., "A closer Look at Spatiotemporal Convolutions for Action Recognition", arXiv:1711.11248v3, Apr. 12, 2018, 10 pages.
C.Y Wu et al., "A Multigrid Method for Efficiently Training Video Models", arXiv:1912.00998v2, Jun. 10, 2020, 11 pages.
C. Feichtenhofer et al., "SlowFast Networks for Video Recognition", International Conference on Computer Vision, Dec. 10, 2018, pp. 6202-6211.
C. Feichtenhofer et al., "X3D: Expanding Architectures for Efficient Video Recognition", arXIV:2004.04730v1, Apr. 9, 2020, 14 pages.
A. Balu, et al., "Distributed Multigrid Neural Solvers on Megavoxel Domains", arXiv:2014.14538v1, Apr. 29, 2021, 21 pages.
Y. Zou et al., "Learning Representational Invariances for Data-Efficient Action Recognition", arXiv:2103.16565v1, Mar. 30, 2021, 10 pages.
International Search Report and Written Opinion for Application No. PCT/CN2021/123421, mailed Apr. 26, 2022, 10 pages.
International Search Report and Written Opinion for Application No. PCT/CN2021/117666, mailed May 25, 2022, 7 pages.
International Preliminary Report on Patentability, PCT App. No. PCT/CN2021/123421, Apr. 25, 2024, 05 pages.
International Search Report and Written Opinion, PCT App. No. PCT/CN2021/123421, Apr. 26, 2022, 07 pages.

* cited by examiner

602

604

612

614

622

624

SAMPLE-ADAPTIVE 3D FEATURE CALIBRATION AND ASSOCIATION AGENT

CROSS REFERENCE TO RELATED APPLICATIONS

The present application is a U.S. National Phase Patent Application, which claims the benefit of priority to International Patent Application No. PCT/CN2021/123421 filed on Oct. 13, 2021.

TECHNICAL FIELD

Embodiments generally relate to computing systems. More particularly, embodiments relate to performance-enhanced deep learning technology utilizing convolutional neural networks for image sequence/video analysis.

BACKGROUND

Deep learning networks such as, for example, convolutional neural networks (CNNs), have become an important candidate technology to be considered for use in image sequence/video analysis tasks, including graphics-related tasks such as video rendering, video action recognition, video ray tracing, etc. Unlike two-dimensional (2D) CNNs which perform convolutional and pooling operations only in the spatial space, three-dimensional (3D) CNNs are constructed with 3D convolution and 3D pooling operations performed in the spatial-temporal space. Use of 3D CNNs, however, presents difficult challenges in application. For example, on the one hand, the increase of input data dimensionality exhibits significantly more complicated feature distribution variations. On the other hand, the model size of 3D CNNs has a cubic growth potential compared to 2D CNNs. These factors result in huge memory and compute demands (from both data and model standpoints) on 3D CNN architectures, making the utilization of 3D CNNs much more difficult compared to 2D CNN-based tasks, effectively preventing the use of generalized 3D CNN architectures for high performance image sequence/video analysis.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

A performance-enhanced computing system as described herein improves performance of CNNs, and in particular 3D CNNs, for image sequence/video analysis. The technology helps improve the overall performance of deep learning computing systems from the perspective of feature representation calibration and association through a sample-adaptive feature calibration and association agent (SA-FCAA). The SA-FCAA technology described herein can be applied to any deep CNN—particularly 3D CNNs—to provide a significant performance boost to image sequence/video analysis tasks in at least two ways. First, the SA-FCAA technology described herein is sample-specific and calibrates a given 3D feature map using statistics conditioned not only on a current input example but also on statistics from feature maps of adjacent convolutional layers and adjacent feature slices along an extra dimension—which can often be a temporal dimension. Second, the SA-FCAA technology associates the calibrated 3D feature map along two orthogonal dimensions via a shared lightweight meta-gating relay unit. By employing these dynamic learning and cross-layer relay capabilities—including association of calibrated features along a network depth and a feature dimension, the technology augments the joint spatiotemporal feature learning capability of 3D CNNs, resulting in significant improvement in inference accuracy and training speed of 3D CNNs.

Figure 1A:
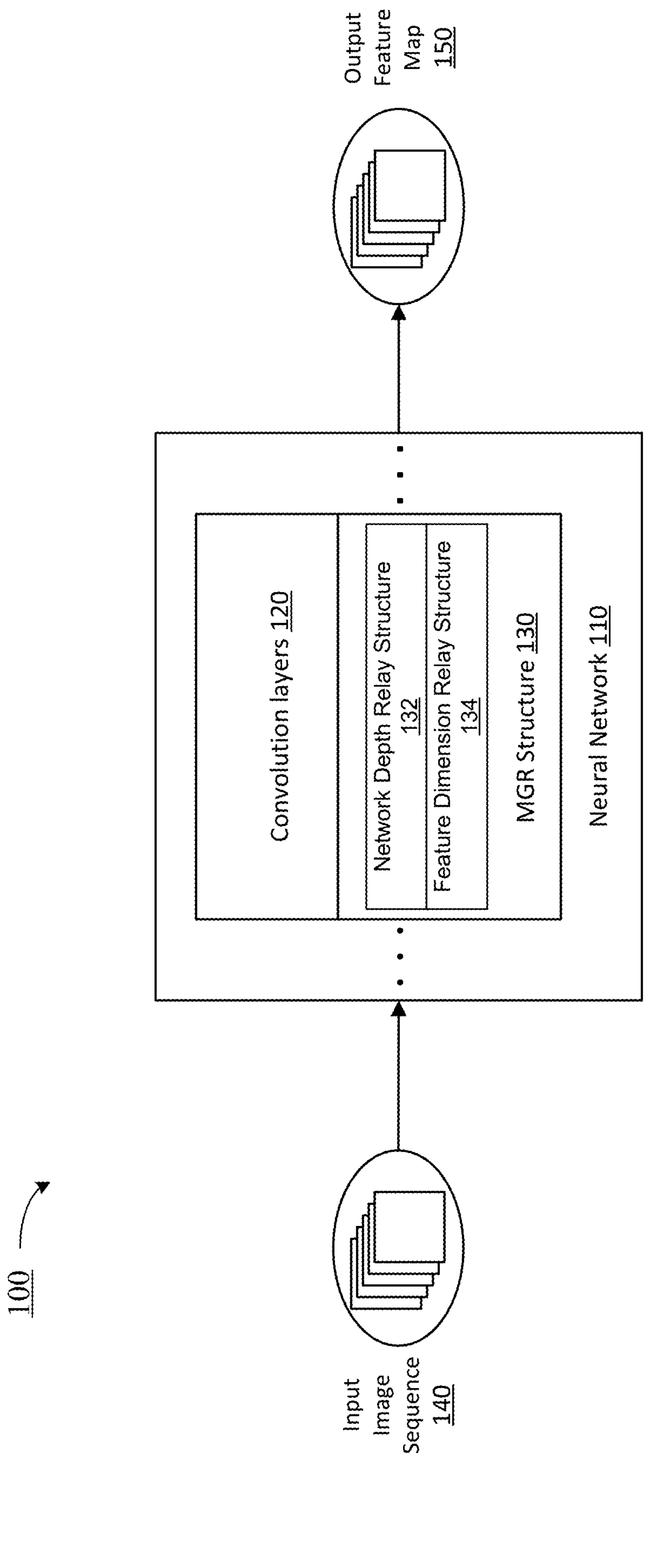
FIGS. 1A-1B provide diagrams illustrating an overview of an example of a system for image sequence/video analysis according to one or more embodiments.
Figure 1B:
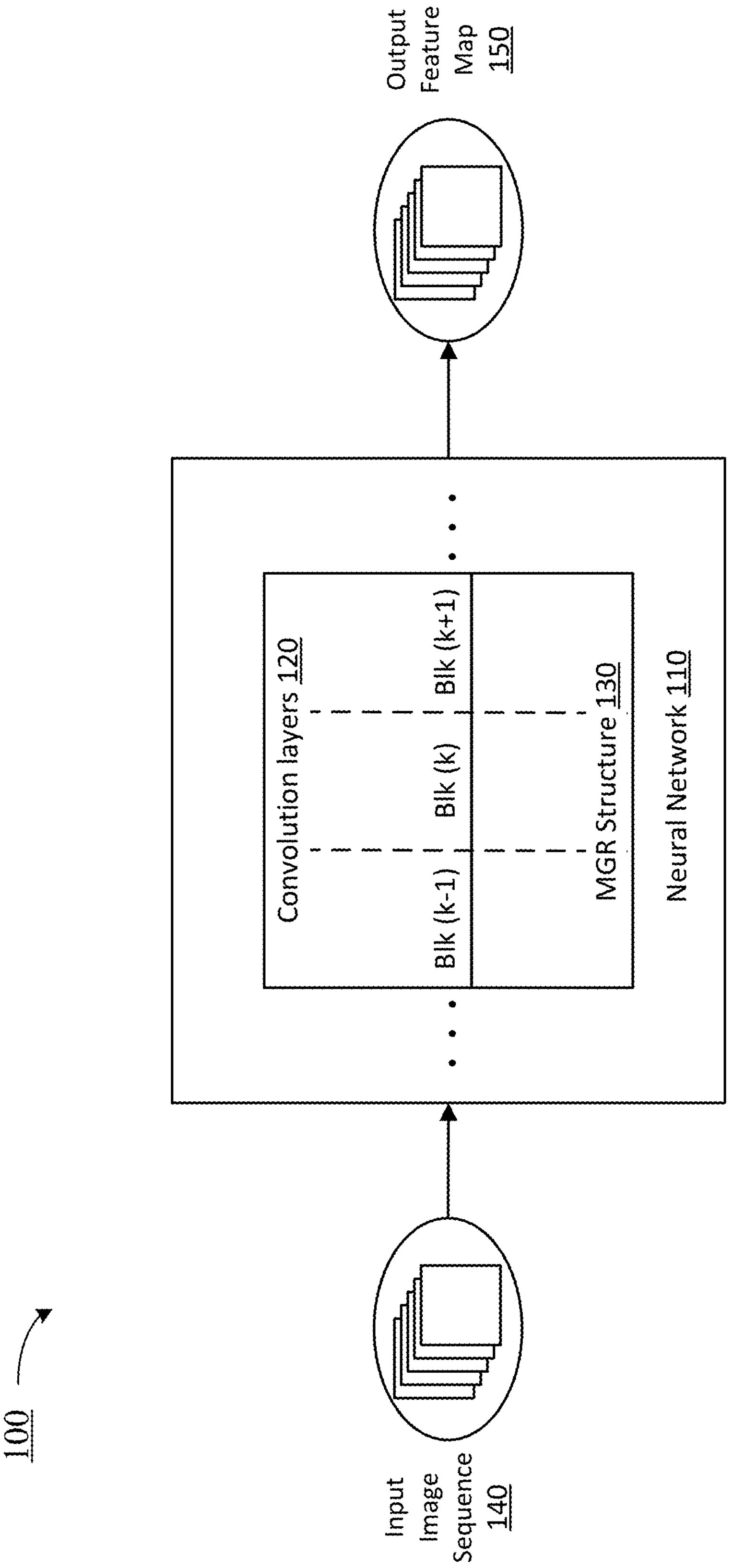

FIGS. 1A-1B provide diagrams illustrating an overview of an example of a system 100 for image sequence/video analysis according to one or more embodiments, with reference to components and features described herein including but not limited to the figures and associated description. The system 100 includes a neural network 110 which, arranged as described herein, incorporates a sample-adaptive mechanism that dynamically generates calibration parameters conditioned on an input feature map to overcome possible inaccurate calibration statistics estimation under restricted batch size settings in CNNs, such as 3D CNNs. The neural network 110 can be a CNN, such as a 3D CNN, that includes a plurality of convolution layers 120. In some embodiments, the neural network 110 can include other types of neural network structures. As shown in FIG. 1A, the neural network 110 further includes a meta-gating relay (MGR) structure 130 to associate the calibrated feature maps across two orthogonal dimensions, such as temporal and network depth dimensions, to augment the spatiotemporal dependencies modeling of 3D features in 3D CNNs. The MGR structure 130 can include a network depth relay structure 132 and a feature dimension relay structure 134, each of which are described further below.

The neural network 110 receives as input an image sequence 140. The image sequence 140 can include, e.g., a video comprised of a sequence of images associated with a period of time. The neural network 110 produces an output feature map 150. The output feature map 150 represents the results of processing the input image sequence 140 via the neural network 110, results which can include classification, detection and/or segmentation of objects, features, etc. from the input image sequence 140.

As shown in FIG. 1B, the convolution layers 120 and the MGR structure 130 of the neural network 110 can be arranged (at least in part) in blocks. The illustration in FIG. 1B depicts 3 blocks, block (k−1), block (k) and block (k+1). While three blocks are illustrated in FIG. 1B, it will be understood that the convolution layers 120 and the MGR structure 130 of the neural network 110 can be arranged (at least in part) in a greater or lesser number of blocks. Further details regarding the neural network 110 are provided herein with reference to FIGS. 2A-2D, 3A-3D, 4A-4D and 5A-5B.

Figure 2A:
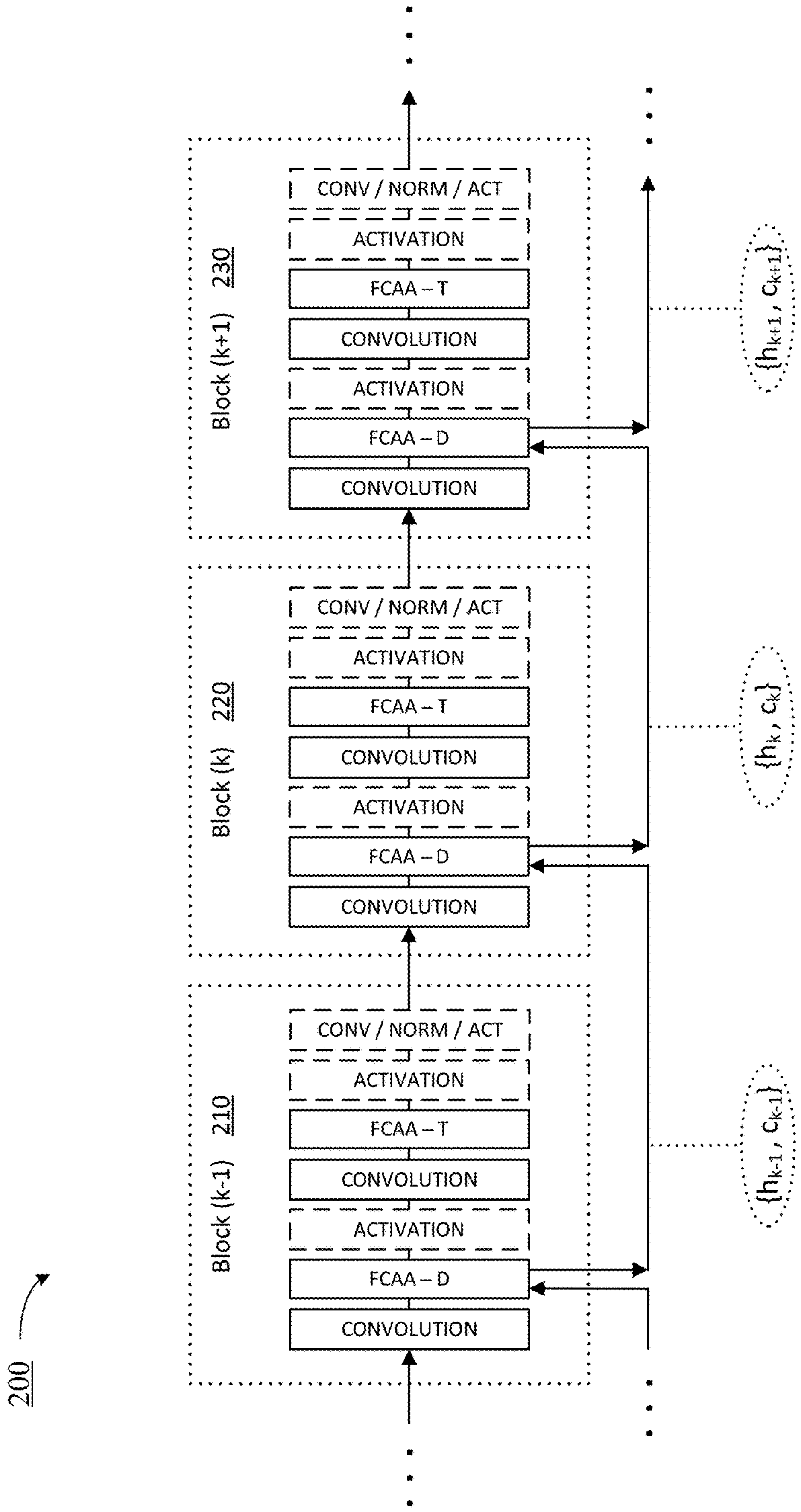
FIGS. 2A-2D provide diagrams of examples of neural network structures according to one or more embodiments.

FIG. 2A provides a diagram of an example of a neural network structure 200 according to one or more embodiments, with reference to components and features described herein including but not limited to the figures and associated description. The neural network structure 200 can be for use in the neural network 110 (FIGS. 1A-1B, already discussed). The neural network structure 200 can include a plurality of blocks, including a block 210, a block 220 and a block 230. The blocks 210, 220 and 230 are indicated with reference to a block number ranging from (k−1), to (k), and to (k+1), respectively. Each block can include a number of layers, including one or more convolution layers, a network depth calibration layer (denoted "FCAA-D"), and a feature dimension calibration layer (denoted "FCAA-T"). In addition, one or more blocks in the neural network structure 200 can include one or more optional activation layers (shown in dotted lines), and/or one or more additional/optional layers, such as convolution layers, normalization layers, etc. (shown in dotted lines); other optional neural network layers can also be included in a block.

Each network depth calibration layer (FCAA-D) typically follows a convolution layer and, similarly, each feature dimension calibration layer (FCAA-T) typically follows another convolution layer. Additionally, the network depth calibration layers are arranged in a cross-block network depth relay structure such that a network depth calibration layer in one block receives a hidden state signal and a cell state signal from a network depth calibration layer in a preceding block. Thus, for example, the network depth calibration layer in block (k+1) receives a hidden state signal $h_k$ and a cell state signal $c_k$ from a network depth calibration layer in block (k), the network depth calibration layer in block (k) receives a hidden state signal $h_{k-1}$ and a cell state signal $c_{k-1}$ from a network depth calibration layer in block (k−1), etc., extending back to the initial block with a network depth calibration layer in the neural network (for such initial block, there would be no preceding block with a network depth calibration layer).

While three blocks are illustrated in FIG. 2A, it will be understood that the number of blocks in the neural network structure 200 can be greater than or less than three. The neural network structure 200 can be inserted in any neural network (such as the neural network 110), and particularly in a 3D CNN, at virtually any position in the neural network. The neural network structure 200 receives input (not shown in FIG. 2A), which can be, e.g., from any part of the neural network 110, and provide output to be used at any portion of the neural network 110. In some embodiments, the neural network structure 200 can be inserted at multiple points in the neural network. In some embodiments, the neural network structure 200 can include residual blocks for use in a neural network. Further details regarding blocks, such as block 210, block 220 and/or block 230 are provided herein with reference to FIGS. 2B-2D.

Figure 2B:
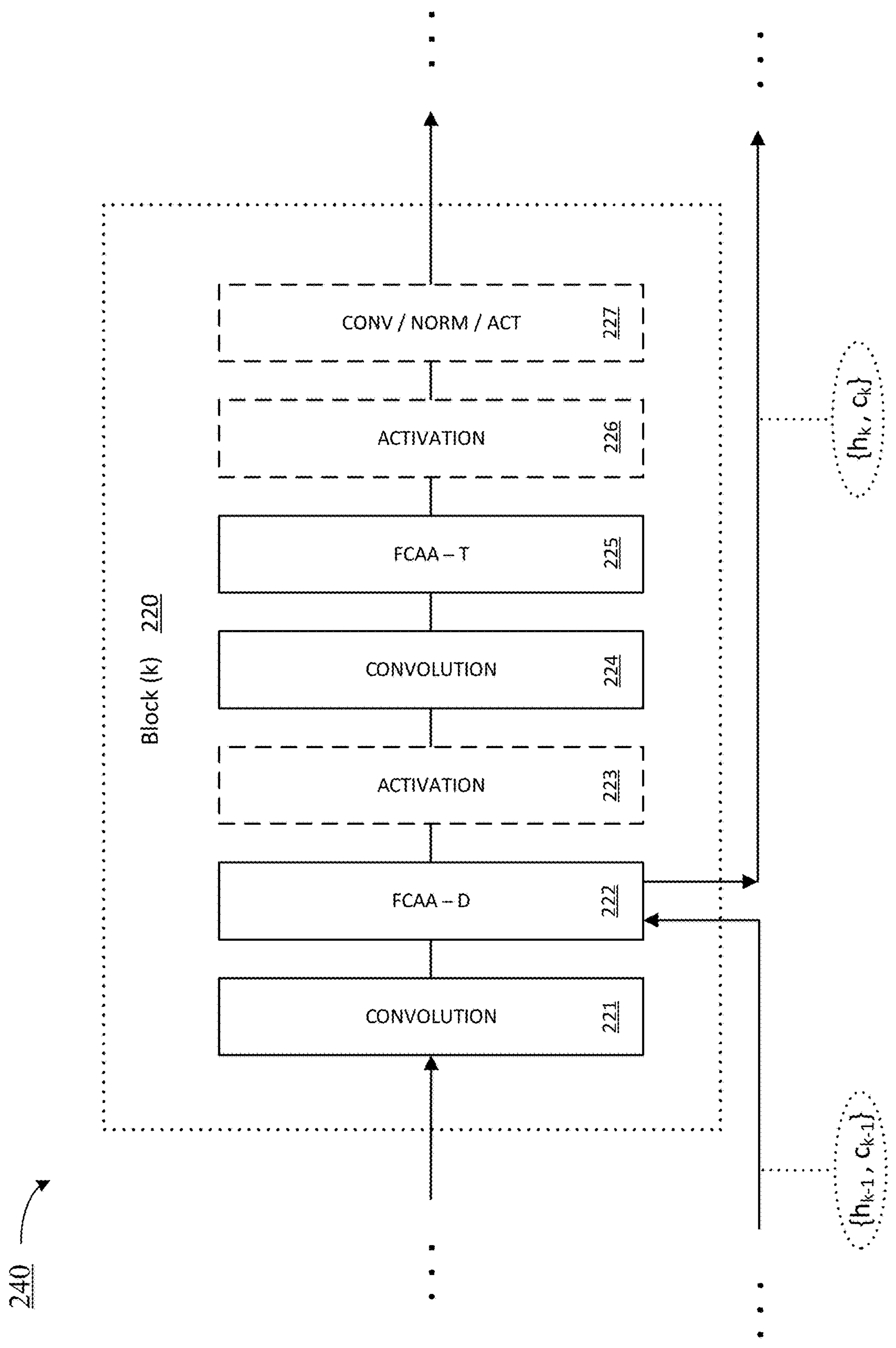

FIG. 2B provides a diagram 240 of an example block 220 for use in the neural network structure 200 according to one or more embodiments, with reference to components and features described herein including but not limited to the figures and associated description. The block 220 represents a block (k) and corresponds to block 220 (FIG. 2A). The structure shown for the block 220 can also apply to other blocks (such as block 210 and/or block 230 in FIG. 2A). Block 220 includes a first convolution layer 221, a network depth calibration layer (FCAA-D) 222, a second convolution layer 224, and a feature dimension calibration layer (FCAA-T) 225. The network depth calibration layer 222 follows the first convolution layer 221, and the feature dimension calibration layer 225 follows the second convolution layer 224. In some embodiments, the order of the network depth calibration layer 222 and the feature dimension calibration layer 225 can be reversed, such that the feature dimension calibration layer 225 follows the first convolution layer 221 and the network depth calibration layer 222 follows the second convolution layer 224.

The network depth calibration layer 222 for block (k) receives a hidden state signal $h_{k-1}$ and a cell state signal $c_{k-1}$ from a network depth calibration layer in a preceding block (k−1), and passes a hidden state signal $h_k$ and a cell state signal $c_k$ to a network depth calibration layer in a succeeding block (k+1). The block 220 can also include one or more optional activation layers, such as the activation layer 223, which follows the network depth calibration layer 222, and/or the activation layer 226, which follows the feature dimension calibration layer 225. Each of the activation layer(s) 223 and/or 226 can include an activation function useful for CNNs, such as, e.g., a rectified linear unit (ReLU) function, a SoftMax function, etc. The block 220 can also include other additional, optional layers such as, e.g., additional convolution, normalization and/or activation layers (collectively labeled 227 in FIG. 2B). The block 220 receives input from a preceding block or another part of the neural network 110, and provides output to a succeeding block or another part of the neural network 110.

Figure 2C:
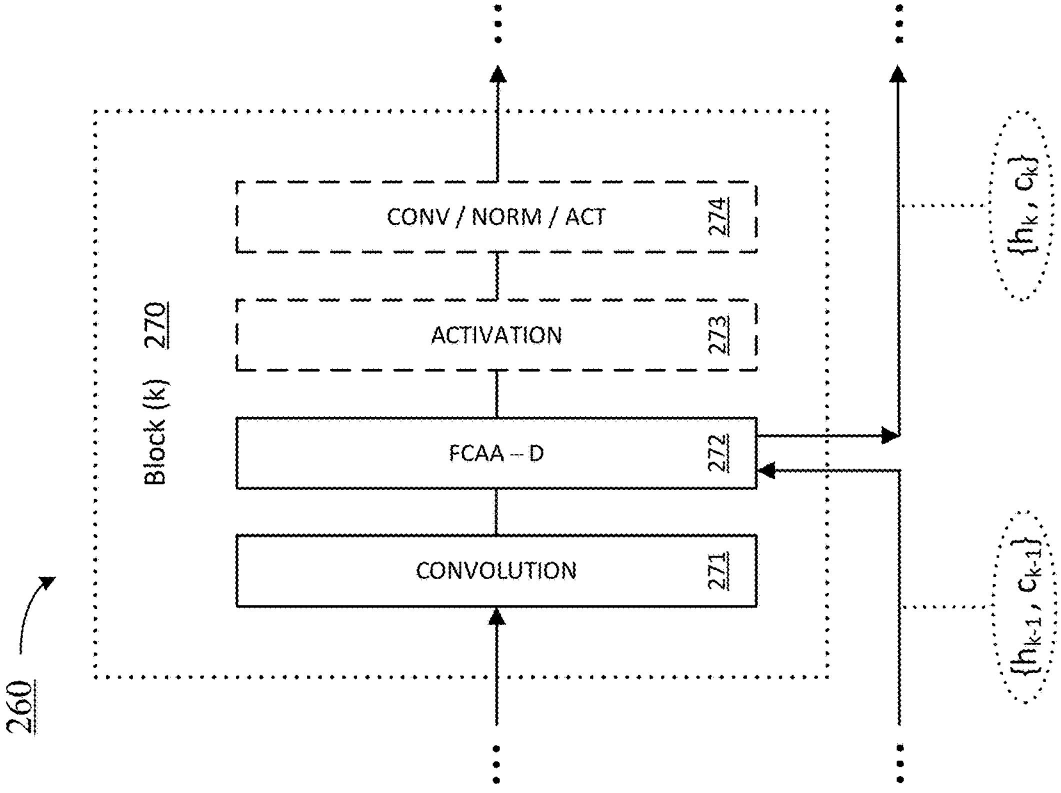

FIG. 2C provides a diagram 260 of an alternative example block 270 for use in the neural network structure 200 according to one or more embodiments, with reference to components and features described herein including but not limited to the figures and associated description. The block 270 represents a block (k) and can be substituted for block 220 (FIGS. 2A-2B). The structure shown for the block 270 can also be substituted for other blocks (such as block 210 and/or block 230 in FIG. 2A). The block 270 includes a convolution layer 271 and a network depth calibration layer (FCAA-D) 272 which follows the convolution layer 271. The network depth calibration layer 272 for block (k)

receives a hidden state signal and a cell state signal from a network depth calibration layer in a preceding block (k−1), and passes a hidden state signal and a cell state signal to a network depth calibration layer in a succeeding block (k+1). The block 270 can also include an optional activation layer, such as the activation layer 273, which follows the network depth calibration layer 272. The activation layer 273 can include an activation function useful for CNNs, such as, e.g., a rectified linear unit (ReLU) function, a SoftMax function, etc. The block 270 can also include other additional, optional layers such as, e.g., additional convolution, normalization and/or activation layers (collectively labeled 274 in FIG. 2C). The block 270 receives input from a preceding block or another part of the neural network 110, and provides output to a succeeding block or another part of the neural network 110.

Figure 2D:
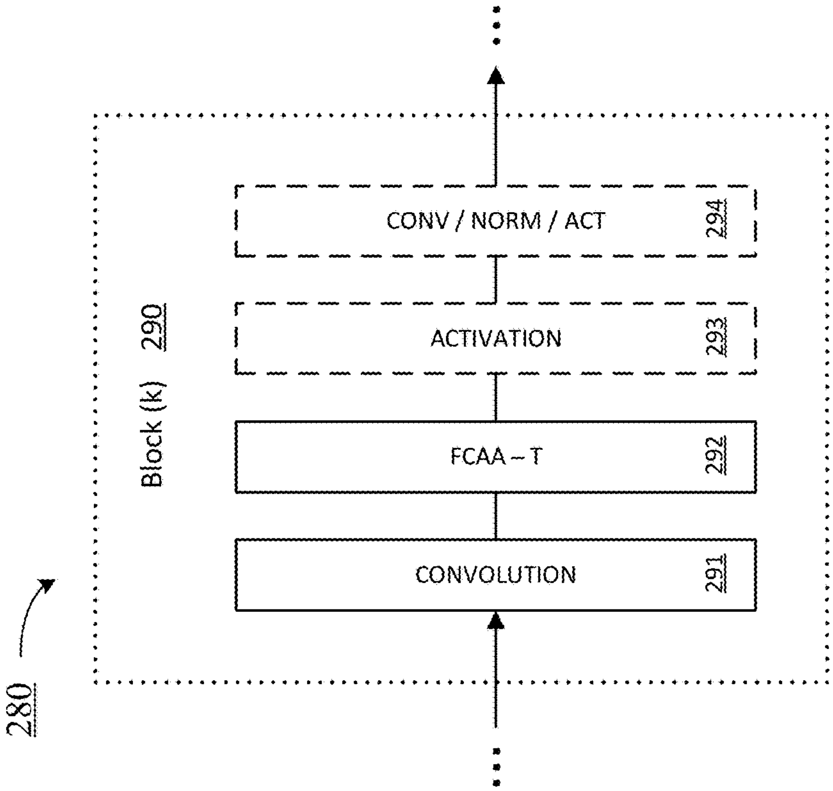

FIG. 2D provides a diagram 280 of another alternative example block 290 for use in the neural network structure 200 according to one or more embodiments, with reference to components and features described herein including but not limited to the figures and associated description. The block 290 represents a block (k) and can be substituted for block 220 (FIGS. 2A-2B). The structure shown for the block 290 can also be substituted for other blocks (such as block 210 and/or block 230 in FIG. 2A). The block 290 includes a convolution layer 291 and a feature dimension calibration layer (FCAA-T) 292 which follows the convolution layer 291. The block 290 can also include an optional activation layers, such as the activation layer 293, which follows the feature dimension calibration layer 292. The activation layer 293 can include an activation function useful for CNNs, such as, e.g., a rectified linear unit (ReLU) function, a SoftMax function, etc. The block 290 can also include other additional, optional layers such as, e.g., additional convolution, normalization and/or activation layers (collectively labeled 294 in FIG. 2D). The block 290 receives input from a preceding block or another part of the neural network 110, and provides output to a succeeding block or another part of the neural network 110.

Figure 3A:
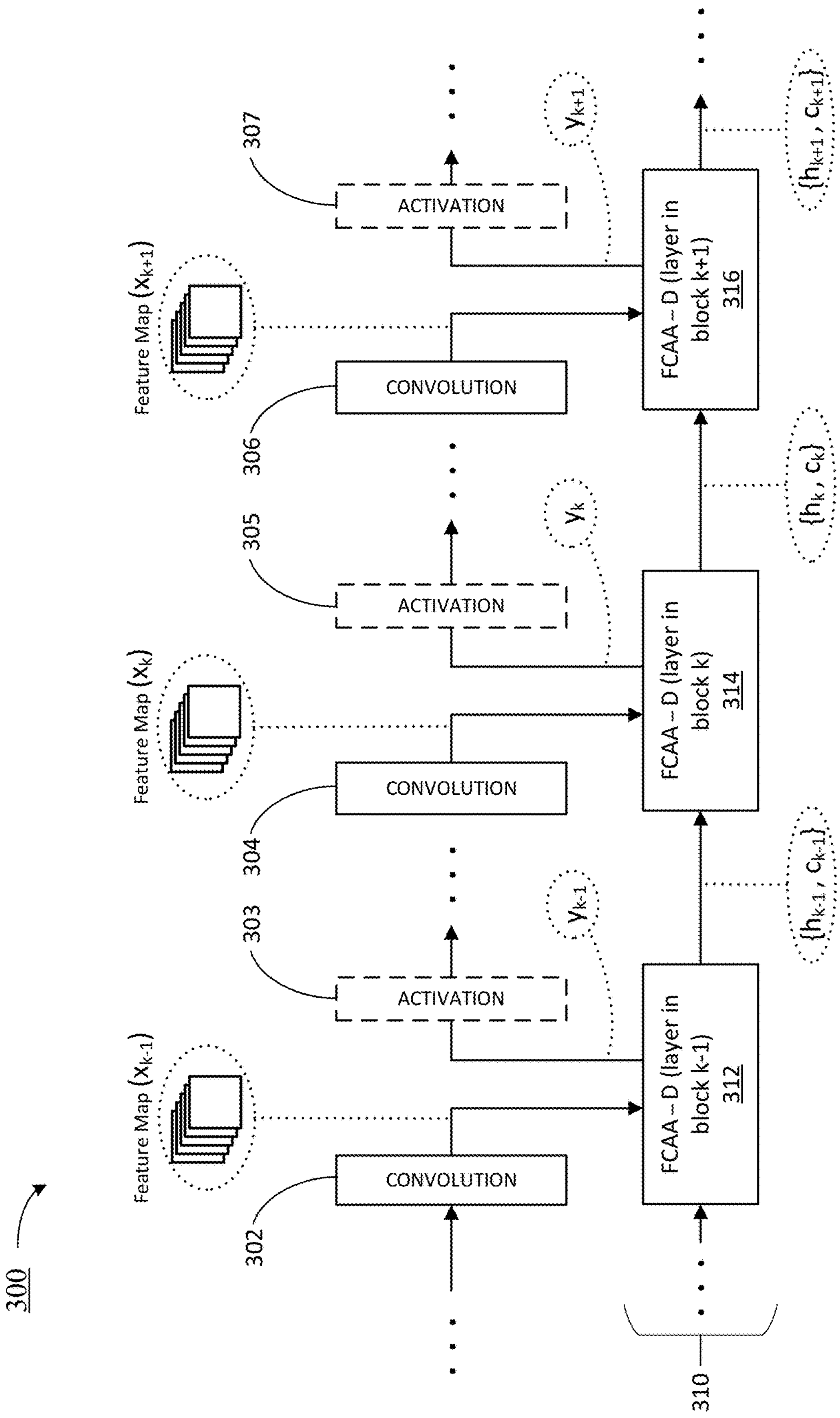
FIG. 3A provides a block diagram of an example of a network depth calibration structure for a neural network according to one or more embodiments.

FIG. 3A provides a block diagram of an example of a network depth calibration structure 300 according to one or more embodiments, with reference to components and features described herein including but not limited to the figures and associated description. The network depth calibration structure 300 can be utilized in all or a portion of the neural network 110 (FIGS. 1A-1B, already discussed). The network depth calibration structure 300 includes a plurality of convolution layers, including a convolution layer 302 (representing a block k−1), a convolution layer 304 (representing a block k), and a convolution layer 306 (representing a block k+1). The convolution layer 302 operates to provide an output feature map $x_{k-1}$. Similarly, the convolution layer 304 operates to provide an output feature map $x_k$, and the convolution layer 306 operates to provide an output feature map $x_{k+1}$. The convolution layers (such as the convolution layer 302, the convolution layer 304, and the convolution layer 306) correspond to the convolution layers 120 (FIGS. 1A-1B, already discussed) and/or to one or more convolution layers shown in FIG. 2A, and have parameters and weights that are determined through a neural network training process. The convolution layer 304 corresponds to convolution layer 221 in FIG. 2B.

The network depth calibration structure 300 further includes a plurality of network depth calibration layers (FCAA-D) arranged in a cross-block network depth relay structure 310, including a network depth calibration layer 312 (for block k−1), a network depth calibration layer 314 (for block k), and a network depth calibration layer 316 (for block k+1). Each network depth calibration layer is coupled to and following a respective convolution layer of the plurality of convolution layers, such that each network depth calibration layer receives an input from the respective convolution layer and provides an output to a succeeding layer. Each network depth calibration layer (that is, each network depth calibration layer after an initial network depth calibration layer in the neural network) is also coupled to a network depth calibration layer in a respective preceding block via a hidden state signal and a cell state signal received from the network depth calibration layer of the respective preceding block. Thus, as shown in the example of FIG. 3A, the cross-block relay structure includes arranging, for each block (k), a network depth calibration layer for the block (k) as coupled to a network depth calibration layer for a preceding block (k−1). The network depth relay structure 310 corresponds to the network depth relay structure 132 (shown in FIG. 1, already discussed).

For example, the network depth calibration layer 312 (for block k−1) receives as input the feature map $x_{k-1}$ from the convolution layer 302. The network depth calibration layer 312 also receives a hidden state signal and a cell state signal from a network depth calibration layer in a preceding block (not shown in FIG. 3A), unless the network depth calibration layer 312 is the initial network depth calibration layer in the neural network (in which case there would be no network depth calibration layer in a preceding block). The network depth calibration layer 312 produces an output feature map $y_{k-1}$. As illustrated for the example of FIG. 3A, the output $y_{k-1}$ can feed into a succeeding block (e.g., block (k)) or another neural network layer.

Similarly, the network depth calibration layer 314 (for block k) receives as input the feature map $x_k$ from the convolution layer 304, and also receives a hidden state signal $h_{k-1}$ and a cell state signal $c_{k-1}$ from the network depth calibration layer 312 in the preceding block (k−1), and produces an output feature map $y_k$. As illustrated for the example of FIG. 3A, the output $y_k$ can feed into a succeeding block (e.g., block (k+1)) or another neural network layer. For the next block, the network depth calibration layer 316 (for block k+1) receives as input the feature map $x_{k+1}$ from the convolution layer 306, and also receives a hidden state signal $h_k$ and a cell state signal $c_k$ from the network depth calibration layer 314 in the preceding block (k), and produces an output feature map $y_{k+1}$. As illustrated for the example of FIG. 3A, the output $y_{k+1}$ can feed into a succeeding block (not shown in FIG. 3A) or another neural network layer. The network depth calibration structure 300 illustrated in FIG. 3A may continue repetitively for all or part of the remainder of the neural network.

The network depth calibration structure 300 can include one or more optional activation layer(s), such as activation layer(s) 303, 305, and/or 307. Each of the activation layer(s) 303, 305, and/or 307 can include an activation function useful for CNNs, such as, e.g., a rectified linear unit (ReLU) function, a SoftMax function, etc.

The activation layer(s) 303, 305, and/or 307 can receive, as input, the output of the respective neighboring network depth calibration layer 312, 314 and/or 316. For example, as illustrated in FIG. 3A the activation layer 303 receives, as input, the output $y_{k-1}$ from the network depth calibration layer 312, and the output of the activation layer 303 feeds into a succeeding block or another neural network layer. Similarly, as illustrated in FIG. 3A the activation layer 305 receives, as input, the output $y_k$ from the network depth calibration layer 314, and the output of the activation layer 305 feeds into a succeeding block or another neural network layer. Likewise, as illustrated in FIG. 3A the activation layer 307 receives, as input, the output $y_{k+1}$ from the network depth calibration layer 316, and the output of the activation layer 256 feeds into a succeeding block or another neural network layer (if present).

In some embodiments, the activation functions of the activation layer(s) 303, 305 and/or 307 can be incorporated into the respective neighboring network depth calibration layer 312, 314 and/or 316. In some embodiments, each of the activation layer(s) 303, 305 and/or 307 can be arranged between a respective convolution layer and the following network depth calibration layer. The network depth calibration structure 300 can include one or more additional/optional neural network layers, such as convolution layers (not shown in FIG. 3A).

Some or all components and features of the network depth calibration structure 300 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components and features of the network depth calibration structure 300 can be implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

Figure 3B:
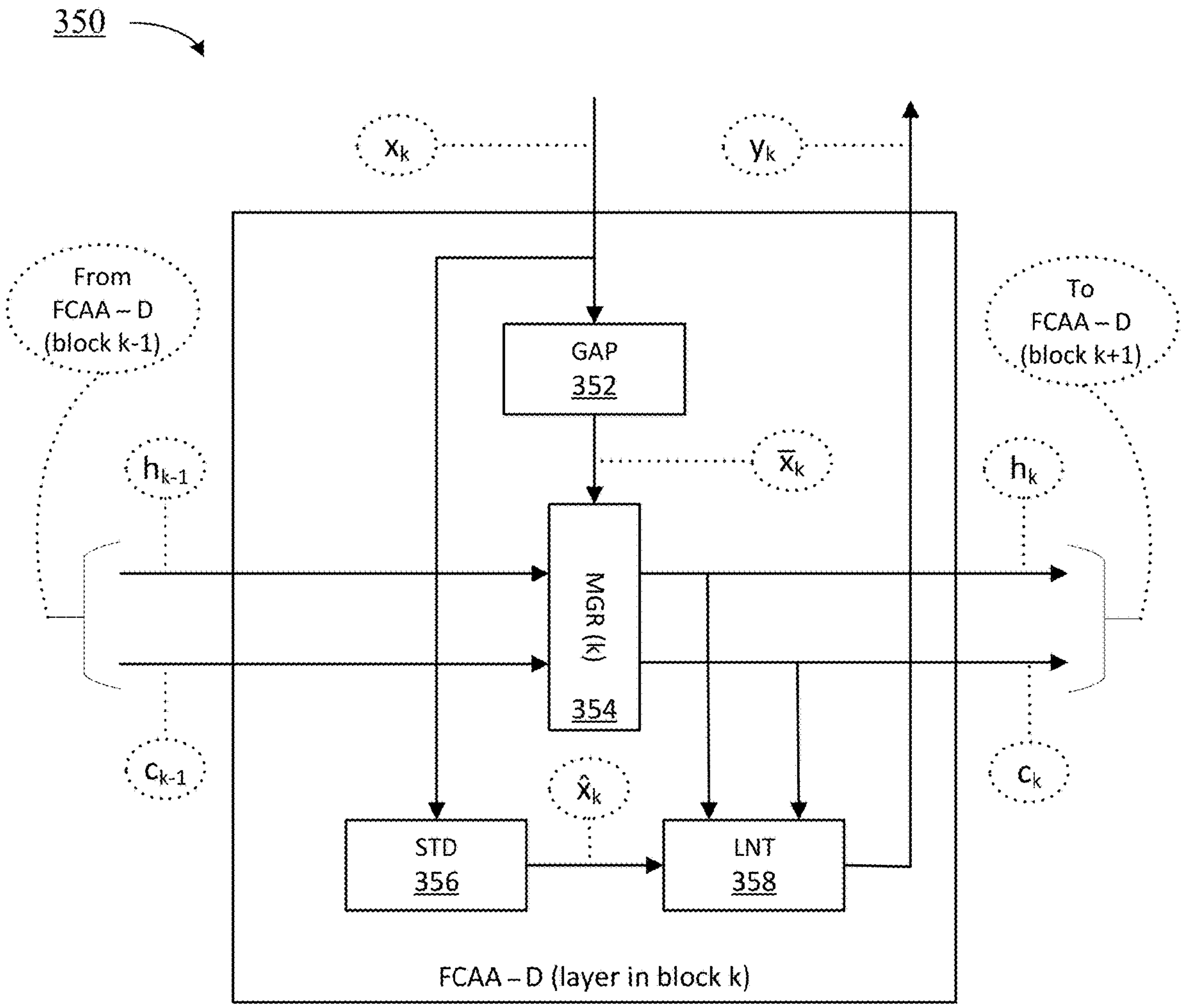
FIG. 3B is a diagram illustrating an example of a network depth calibration layer for a neural network according to one or more embodiments.

FIG. 3B provides a diagram illustrating an example of a network depth calibration layer (FCAA-D) 350 for a neural network according to one or more embodiments, with reference to components and features described herein including but not limited to the figures and associated description. The network depth calibration layer 350 can correspond to the network depth calibration layer 222 (FIG. 2B, already discussed), the network depth calibration layer 272 (FIG. 2C, already discussed), and/or any of the network depth calibration layers 312, 314 and/or 316 (FIG. 3A, already discussed). As illustrated in FIG. 3B, the network depth calibration layer 350 will be described with reference to a block (k) (e.g., corresponding to the network depth calibration layer 314 of FIG. 3A). The network depth calibration layer 350 receives, as an input, the output feature map $x_k$ of the convolution layer for block k (e.g., the convolution layer 304 illustrated in FIG. 3A, already discussed). The feature map $x_k$ can represent, for example, a video (or image sequence) feature map, which is a feature tensor having a temporal dimension T along with other dimensions associated with an image:

$$x_k \in \mathbb{R}^{N\times C\times T\times H\times W} \quad \text{EQ. (1)}$$

where N, C, T, H, W indicate batch size, number of channels, temporal length, height and width, respectively, for the tensor $x_k$.

The network depth calibration layer 350 can include a first global average pooling (GAP) function 352, a first meta-gating relay (MGR) unit 354, a first standardization (STD) function 356, and a first linear transformation (LNT) function 358. The GAP function 352 is a function known for use in CNNs. The GAP function 352 operates on the feature map $x_k$ (e.g., the feature map $x_k$ generated by the convolution layer 304 for block (k) in FIG. 3A) by computing the average output of the feature map $x_k$ to generate an output $\bar{x}_k$:

$$\bar{x}_k = GAP(x_k) \quad \text{EQ. (2)}$$

which represents a spatial-temporal aggregation of the input feature map $x_k$. For an input feature map having dimensionality (N×C×T×H×W), the GAP function 352 produces a resulting output of dimensionality (N×C×1).

The output of the GAP function 352, $\bar{x}_k$, feeds into the first MGR unit 354. The first MGR unit 354 is a shared lightweight structure enabling dynamic generation of feature calibration parameters and relaying these parameters between coupled layers along the neural network depth. The first MGR unit 354 of the network depth calibration layer 350 receives additional input from the network depth calibration layer of a preceding block (k−1) in the form of a hidden state signal $h_{k-1}$ and a cell state signal $c_{k-1}$, and generates an updated hidden state signal $h_k$ and an updated cell state signal $c_k$:

$$(h_k, c_k) = MGR(\bar{x}_k, (h_{k-1}, c_{k-1})) \quad \text{EQ. (3)}$$

The updated hidden state signal $h_k$ and the updated cell state signal $c_k$ feed into the LNT function 358, and also feed into a network depth calibration layer of a succeeding block (k+1). Further details regarding the first MGR unit 354 are provided herein with reference to FIGS. 3C-3D.

The STD function 356 operates on the input feature map $x_k$ by computing a standardized feature as follows:

$$\hat{X}_k = \frac{x_k - \mu}{\sqrt{\sigma^2 + \epsilon}} \quad \text{EQ. (4)}$$

where μ and σ are mean and standard deviation computed within non-overlapping subsets of the input feature map, and ∈ is a small constant to preserve numerical stability. The output of the STD function 356, $\hat{x}_k$, is a standardized feature expected to be in a distribution with zero mean and unit variance. The standardized feature, $\hat{x}_k$, feeds into the LNT function 358.

The LNT function 358 operates on the standardized feature, $\hat{x}_k$, to calibrate and associate the feature representation capacity of the feature map. The LNT function 358 uses the hidden state signal $h_k$ and the cell state signal $c_k$ (which, as described herein, are generated by the first MGR unit 354) as scale and shift parameters to compute an output $y_k$ as follows:

$$y_k = h_k \hat{x}_k + c_k \quad \text{EQ. (5)}$$

where $y_k$ is the output of the network depth calibration layer for block (k), $h_k$ and $c_k$ are the hidden state signal and cell state signal, respectively, generated by the first MGR unit 354, and $\hat{x}_k$ is the standardized feature generated by the STD function 356. In this way, the calibrated 3D feature $y_k$ receives the feature distribution dynamics of the previous layer and relays its calibration statistics to the next layer via the shared network depth relay structure.

Some or all components and features of the network depth calibration layer 350 can be implemented using one or more of a CPU, a GPU, an AI accelerator, an FPGA accelerator, an ASIC, and/or via a processor with software, or in a combination of a processor with software and an FPGA or ASIC. More particularly, components and features of the network depth calibration layer 350 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Figure 3C:
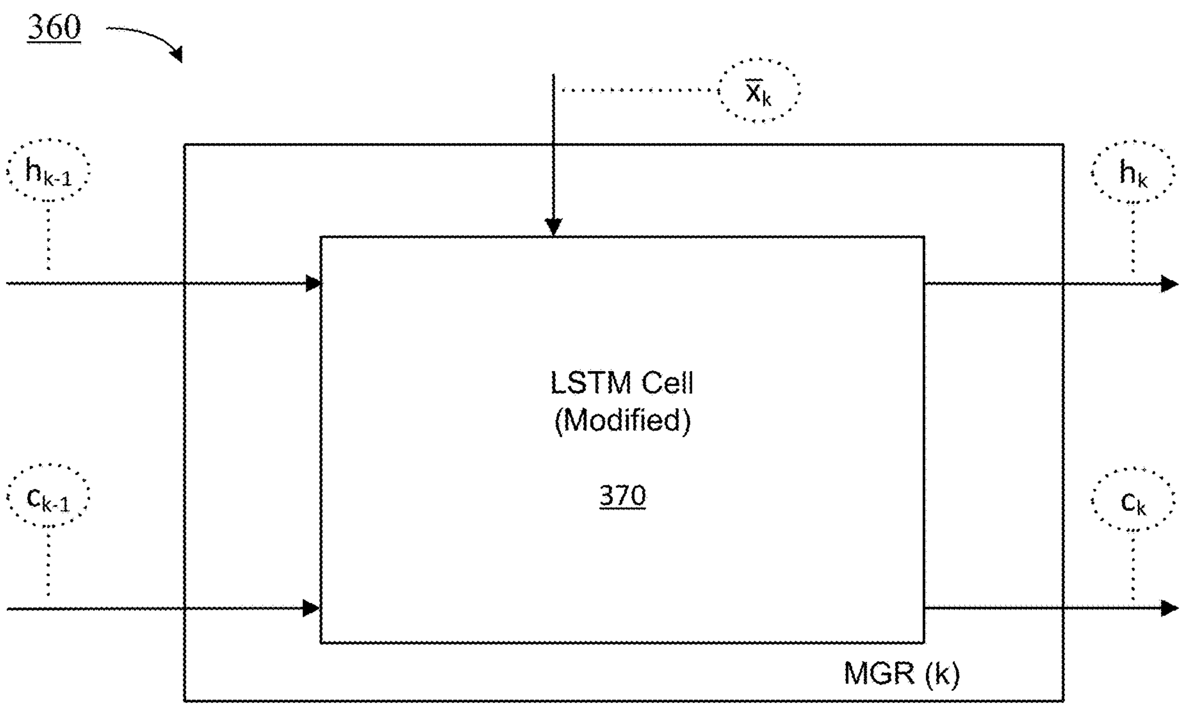
FIGS. 3C-3D are diagrams illustrating examples of a meta-gating relay (MGR) unit for a network depth calibration layer of a neural network according to one or more embodiments.

FIG. 3C provides a diagram illustrating an example of a meta-gating relay (MGR) unit 360 for a network depth calibration layer (block k) of a neural network according to one or more embodiments, with reference to components and features described herein including but not limited to the figures and associated description. The MGR unit 360 can correspond to the first MGR unit 354 (FIG. 3B, already discussed). The MGR unit 360 includes a modified long-short term memory (LSTM) cell 370. The modified LSTM cell 370 can be generated from a LSTM cell used in neural networks; an example of a modified LSTM cell is provided herein with reference to FIG. 3D. The modified LSTM cell 370 receives as input the spatial-temporal aggregation $\bar{x}_k$ (EQ. 2) as well as the hidden state signal $h_{k-1}$ and the cell state signal $c_{k-1}$ from the network depth calibration layer of a preceding block (k−1) to generate an updated hidden state signal $h_k$ and an updated cell state signal $c_k$.

Figure 3D:
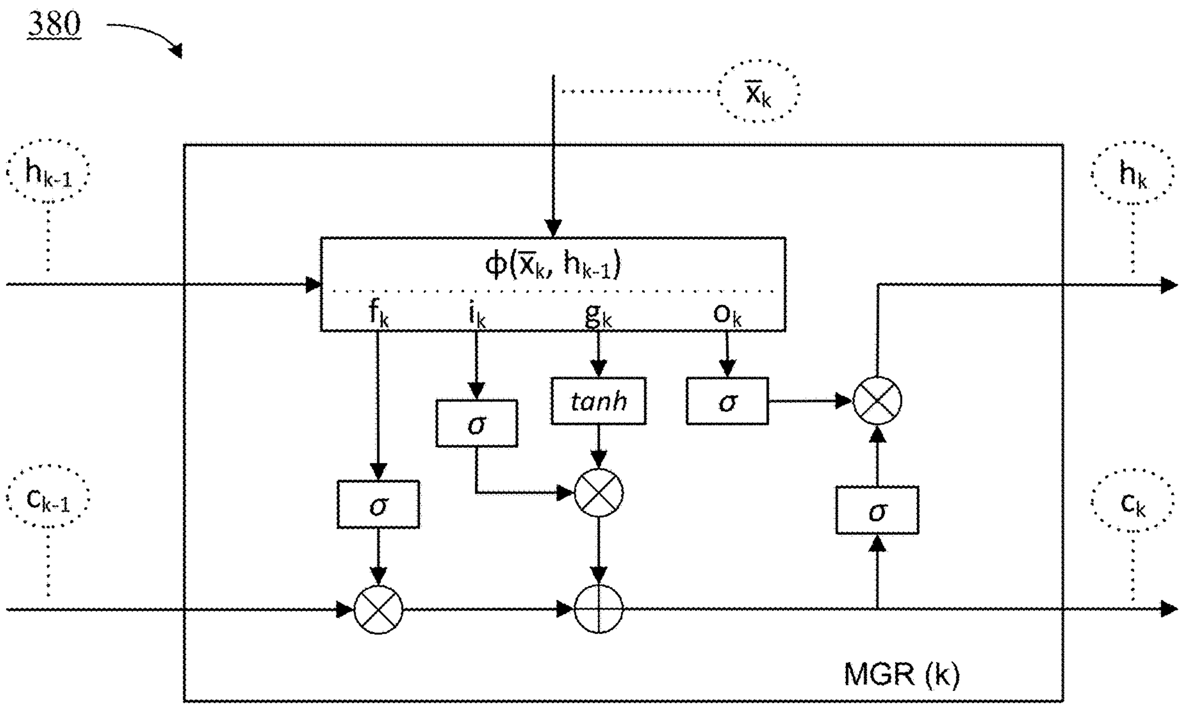

FIG. 3D provides a diagram illustrating an example of a MGR unit 380 for a network depth calibration layer (block k) of a neural network according to one or more embodiments, with reference to components and features described herein including but not limited to the figures and associated description. The MGR unit 380 can correspond to the first MGR unit 354 (FIG. 3B, already discussed) and/or to the MGR unit 360 (FIG. 3C, already discussed). In particular, the MGR unit 380 comprises an example of a modified LSTM cell, such as the modified LSTM cell 370 (FIG. 3C, already discussed). The MGR unit 380 provides a gating mechanism that can be denoted by:

$$(f_k, i_k, g_k, o_k) = \phi([\bar{x}_k, h_{k-1}]) + b \qquad \text{EQ. (6)}$$

where φ(•) is a bottleneck unit for processing the spatial-temporal aggregation $\bar{x}_k$(EQ. 2) and the hidden state signal $h_{k-1}$ from the network depth calibration layer (k−1), and b is a bias. For example, the bottleneck unit φ(•) can be a contraction-expansion bottleneck unit having a fully connected (FC) layer which maps the input to a low dimensional space with the reduction ratio r, a ReLU activation layer, and another FC layer which maps the input back to the original dimensional space. In some embodiments, the bottleneck unit φ(•) can be implemented with a reduction ratio of 4. In some embodiments, the bottleneck unit φ(•) can be implemented as any form of linear or nonlinear mapping. The dynamically-generated parameters $f_k$, $i_k$, $g_k$, $o_k$ form a set of gates to regularize the update of the cell state signal $c_k$ and the hidden state signal $h_k$ of the MGR unit 380 for block (k) as follows:

$$c_k = \sigma(f_k) \odot c_{k-1} + \sigma(i_k) \odot \tanh(g_k) \qquad \text{EQ. (7)}$$

and $$h_k = \sigma(o_k) \odot \sigma(c_k) \qquad \text{EQ. (8)}$$

where $c_k$ is the updated cell state signal, $h_k$ is the updated hidden state signal, $c_{k-1}$ is the cell state signal from the preceding network depth calibration layer of block (k−1), σ(•) is the sigmoid function, and ⊙ is the Hadamard product operator.

Some or all components and features of the MGR unit 360 and/or the MGR unit 380 can be implemented using one or more of a CPU, a GPU, an AI accelerator, an FPGA accelerator, an ASIC, and/or via a processor with software, or in a combination of a processor with software and an FPGA or ASIC. More particularly, components and features of the MGR unit 360 and/or the MGR unit 380 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Figure 4A:
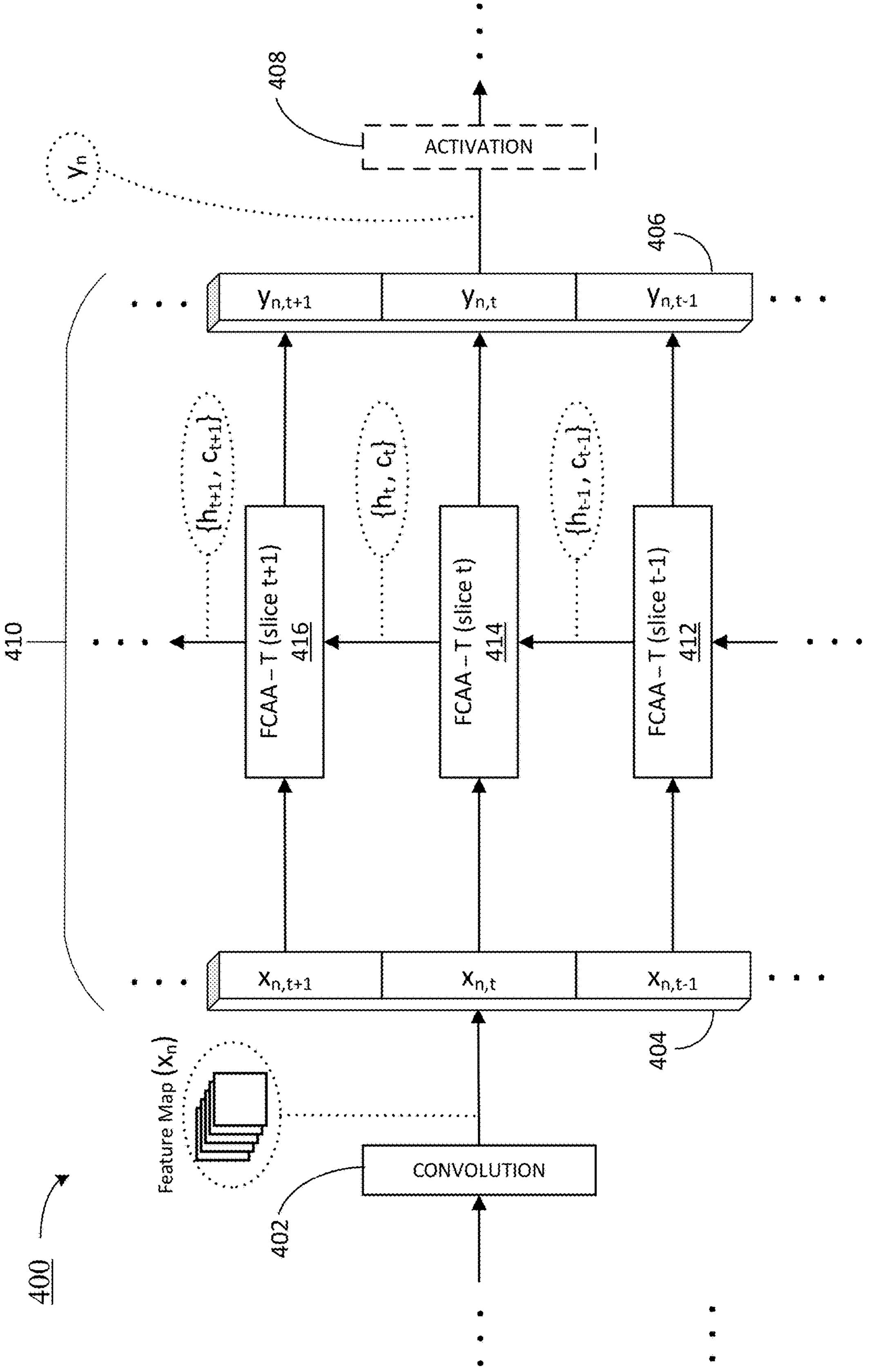
FIG. 4A provides a block diagram of an example of a feature dimension calibration structure for a neural network according to one or more embodiments.

FIG. 4A provides a block diagram of an example of a feature dimension calibration structure 400 according to one or more embodiments, with reference to components and features described herein including but not limited to the figures and associated description. The feature dimension calibration structure 400 can be utilized in all or a portion of the neural network 110 (FIGS. 1A-1B, already discussed). The feature dimension calibration structure 400 includes a convolution layer 402 (representing a layer n). The convolution layer 402 operates to provide an output feature map $x_n$. The convolution layer 402 corresponds to one or more convolution layers shown in FIG. 2A and to convolution layer 224 in FIG. 2B, and has parameters and weights that are determined through a neural network training process. The feature map $x_n$ can represent, for example, a video (or image sequence) feature map, similar to the feature map $x_k$ described above with reference to FIGS. 3A-3D.

The feature map $x_n$ as output from the convolution layer 402 can be split into a set of T slices 404 $\{x_{n,1}, x_{n,2}, \ldots x_{n,t} \ldots, x_{n,T}\}$ along the temporal dimension, such that each slice $x_{n,t}$ represents a feature slice corresponding to one or more frames (e.g., an input frame or frames for a $t^{th}$ slice). In some embodiments, the feature slices 404 $\{x_{n,1}, x_{n,2}, \ldots x_{n,t-1}, x_{n,t}, x_{n,t+1}, \ldots, x_{n,T}\}$ can represent a feature map split along a feature dimension other than the temporal dimension.

The feature dimension calibration structure 400 includes a plurality of feature dimension calibration slices (e.g., FCAA-T (slice t)) arranged in a feature dimension relay structure 410. The feature dimension relay structure 410 includes a feature dimension calibration slice 412 (for slice t−1), a feature dimension calibration slice 414 (for slice t), and a feature dimension calibration slice 416 (for slice t+1), etc. Each feature dimension calibration slice receives an input from the respective feature slice (e.g., $x_{n,t}$) and produces an output slice (e.g., $y_{n,t}$). The output is a set of T slices 406 $\{y_{n,1}, y_{n,2}, \ldots y_{n,t-1}, y_{n,t}, y_{n,t+1}, \ldots, y_{n,T}\}$.

Each feature dimension calibration slice (that is, each feature dimension calibration slice other than the initial slice t=1) is also coupled to a feature dimension calibration slice in a respective preceding slice via a hidden state signal and a cell state signal received from the feature dimension calibration slice of the respective preceding slice. Thus, as shown in the example of FIG. 4A, the feature dimension relay structure 410 includes arranging, for each slice (t), a feature dimension calibration slice as coupled to a feature dimension calibration slice for a preceding slice (t−1). The feature dimension relay structure 410 corresponds to feature dimension relay structure 134 (shown in FIG. 1, already discussed). The feature dimension relay structure 410 also corresponds to the feature dimension calibration layer 225 (FIG. 2B, already discussed), and/or to the feature dimension calibration layer 292 (FIG. 2D, already discussed).

For example, the feature dimension calibration slice 412 (for slice t−1) receives input from slice $x_{n,t-1}$ and also receives a hidden state signal and a cell state signal from a feature calibration slice in a preceding slice (not shown in FIG. 4A), unless the slice t−1 is the initial slice (in which case there would be no preceding feature calibration slice). The feature dimension calibration slice 412 (for slice t−1) produces an output slice $y_{n,t-1}$.

Similarly, the feature dimension calibration slice 414 (for slice t) receives input from slice $x_{n,t}$ and also receives a hidden state signal $h_{t-1}$ and a cell state signal $c_{t-1}$ from the feature dimension calibration slice 412 (for slice t−1), and produces an output slice $y_{n,t}$. For the next slice, the feature dimension calibration slice 416 (for slice t+1) receives input from slice $x_{n,t+1}$ and also receives a hidden state signal $h_t$ and a cell state signal $c_t$ from the feature dimension calibration slice 414 (for slice t), and produces an output slice $y_{n,t+1}$. The output slices 406 $\{y_{n,1}, y_{n,2}, \ldots y_{n,t-1}, y_{n,t}, y_{n,t+1}, \ldots, y_{n,T}\}$ can be combined into a feature map $y_n$ and, as illustrated for the example of FIG. 4A, provided to another layer or portion of the neural network. The feature dimension calibration structure 400 illustrated in FIG. 4A may be repeated in one or more blocks in the neural network.

The feature dimension calibration structure 400 can include one or more optional activation layer(s), such as activation layer 408. Each activation layer 408 can include an activation function useful for CNNs, such as, e.g., a rectified linear unit (ReLU) function, a SoftMax function, etc. In some embodiments, the activation functions of the activation layer 408 can be incorporated into the feature dimension calibration slices 412, 414 and/or 416. The feature dimension calibration structure 400 can include one or more additional/optional neural network layers, such as convolution layers (not shown in FIG. 4A).

Some or all components and features of the feature dimension calibration structure 400 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components and features of the feature dimension calibration structure 400 can be implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

Figure 4B:
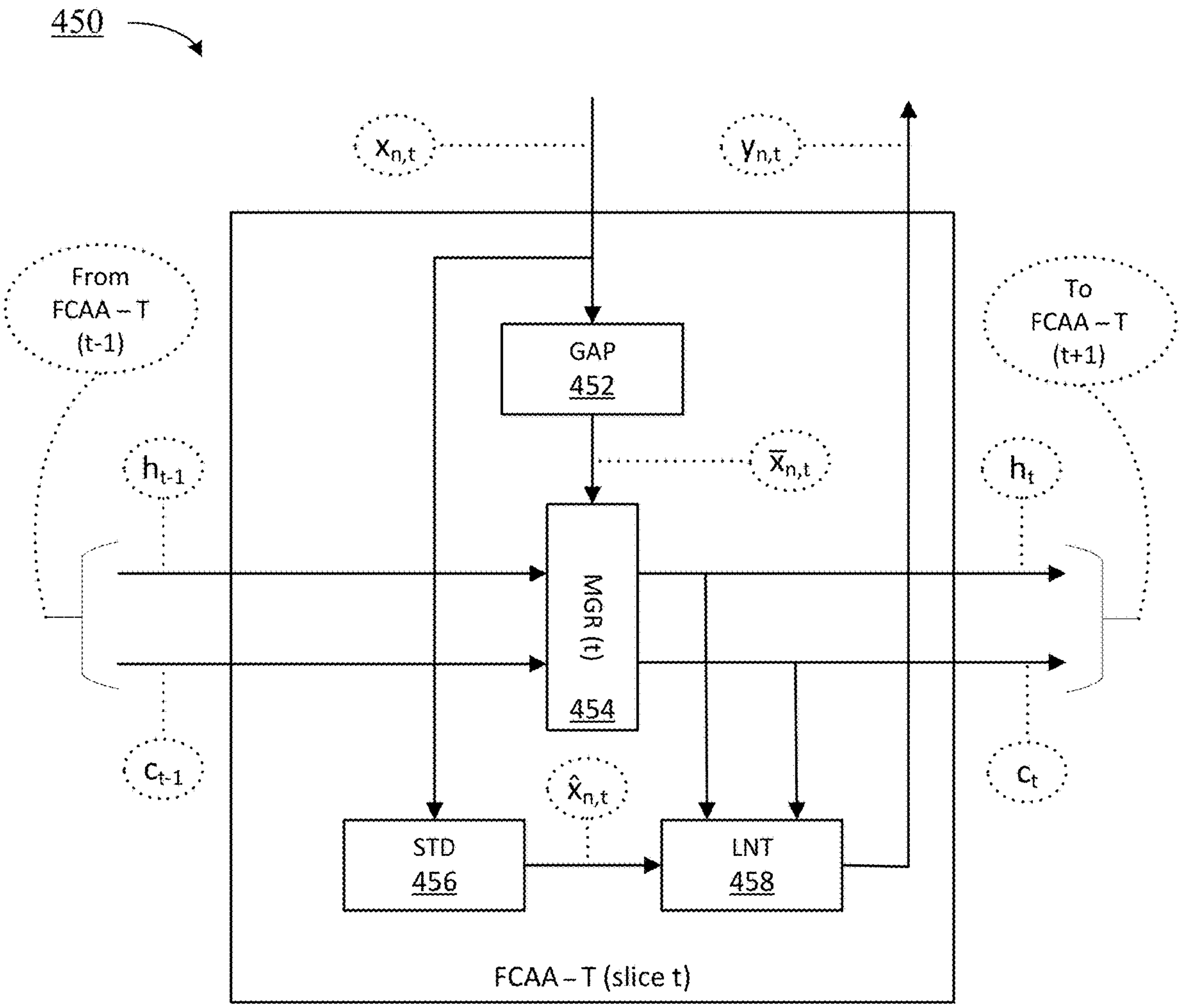
FIG. 4B is a diagram illustrating an example of a feature dimension calibration slice for a neural network according to one or more embodiments.

FIG. 4B provides a diagram illustrating an example of a feature dimension calibration slice (FCAA-T) 450 for a neural network according to one or more embodiments, with reference to components and features described herein including but not limited to the figures and associated description. The feature dimension calibration slice 450 can correspond to any of the feature dimension calibration slices 412, 414 and/or 416 (FIG. 4A, already discussed). As illustrated in FIG. 4B, the feature dimension calibration slice 450 will be described with reference to a slice (t) (e.g., corresponding to the feature dimension calibration slice 414 of FIG. 4A). The feature dimension calibration slice 450 receives, as an input, a slice $x_{n,t}$ of a feature map $x_n$ (e.g., the slice $x_{n,t}$ of the feature map $x_n$ illustrated in FIG. 4A, already discussed).

The feature dimension calibration slice 450 can include a second GAP function 452, a second MGR unit 454, a second STD function 456, and a second LNT function 458. The GAP function 452 is a function known for use in CNNs, and is of the same form as the GAP function 352 (FIG. 3B, already discussed). The GAP function 452 operates on the feature slice $x_{n,t}$ by computing the average output of the feature slice $x_{n,t}$ to generate an output $\bar{x}_{n,t}$:

$$\bar{x}_{n,t} = GAP(x_{n,t}) \quad \text{EQ. (9)}$$

which represents a spatial aggregation of the input feature slice $x_{n,t}$. For an input feature map having dimensionality (N×C×T×H×W), the GAP function 452 produces a resulting output of dimensionality (N×C×1).

The output of the GAP function 452, $\bar{x}_{n,t}$, feeds into the second MGR unit 454. The second MGR unit 454 is a shared lightweight structure enabling dynamic generation of feature calibration parameters and relaying these parameters between coupled slices along the temporal dimension. The second MGR unit 454 of the feature dimension calibration slice 450 receives additional input from the feature dimension calibration slice of a preceding slice (t−1) in the form of a hidden state signal $h_{t-1}$ and a cell state signal $c_{t-1}$, and generates an updated hidden state signal $h_t$ and an updated cell state signal $c_t$:

$$(h_t, c_t) = MGR(\bar{x}_t, (h_{t-1}, c_{t-1})) \quad \text{EQ. (10)}$$

The updated hidden state signal $h_t$ and the updated cell state signal $c_t$ feed into the LNT function 458, and also feed into a feature dimension calibration slice of a succeeding slice (t+1). Further details regarding the second MGR unit 454 are provided herein with reference to FIGS. 4C-4D.

The STD function 456 is of the same form as the STD function 356 (FIG. 3B, already discussed). The STD function 456 operates on the input feature slice $x_{n,t}$ by computing a standardized feature as follows:

$$\hat{x}_{n,t} = \frac{x_{n,t} - \mu}{\sqrt{\sigma^2 + \epsilon}} \quad \text{EQ. (11)}$$

where μ and σ are mean and standard deviation computed within non-overlapping subsets of the input feature map, and ∈ is a small constant to preserve numerical stability. The output of the STD function 456, $\bar{x}_{n,t}$, is a standardized feature expected to be in a distribution with zero mean and unit variance. The standardized feature, $\hat{x}_{n,t}$, feeds into the LNT function 458.

The LNT function 458 is of the same form as the LNT function 358 (FIG. 3B, already discussed). The LNT function 458 operates on the standardized feature, $\hat{x}_{n,t}$, to calibrate and associate the feature representation capacity of the feature slice. The LNT function 458 uses the hidden state signal $h_t$ and the cell state signal $c_t$ (which, as described herein, are generated by the second MGR unit 454) as scale and shift parameters to compute an output $y_{n,t}$ as follows:

$$y_{n,t} = h_t \hat{x}_{n,t} + c_t \quad \text{EQ. (12)}$$

where $y_{n,t}$ is the output of the feature dimension calibration slice for slice (t), $h_t$ and $c_t$ are the hidden state signal and cell state signal, respectively, generated by the second MGR unit 454, and $\hat{x}_{n,t}$ is the standardized feature generated by the STD function 456. In this way, the calibrated 3D feature $y_{n,t}$ receives the feature distribution dynamics of the previous time slice (e.g., timestamp) and relays its calibration statistics to the next time slice (e.g., timestamp) via the shared feature dimension relay structure.

Some or all components and features of the feature dimension calibration slice 450 can be implemented using one or more of a CPU, a GPU, an AI accelerator, an FPGA accelerator, an ASIC, and/or via a processor with software, or in a combination of a processor with software and an FPGA or ASIC. More particularly, components and features of the feature dimension calibration slice 450 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Figure 4C:
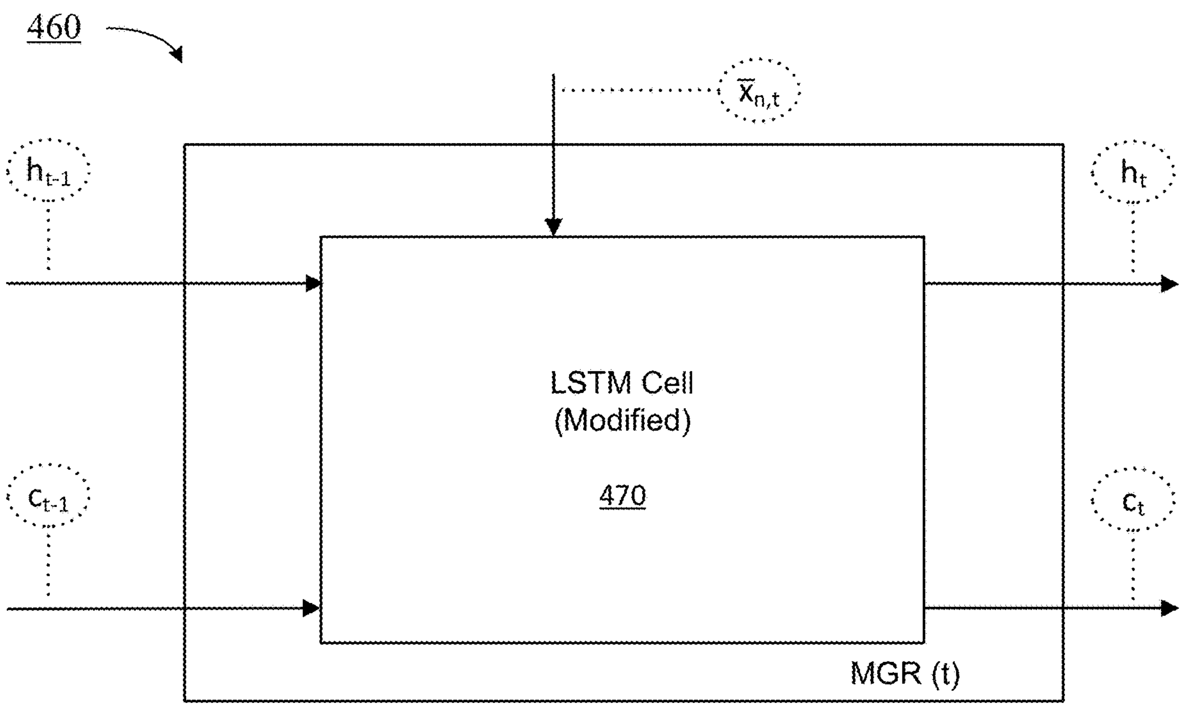
FIGS. 4C-4D are diagrams illustrating examples of a MGR unit for a feature dimension calibration slice of a neural network according to one or more embodiments.

FIG. 4C provides a diagram illustrating an example of a MGR unit 460 for a feature dimension calibration slice according to one or more embodiments, with reference to components and features described herein including but not limited to the figures and associated description. The MGR unit 460 can correspond to the second MGR unit 454 (FIG. 4B, already discussed). The MGR unit 460 includes a modified LSTM cell 470. The modified LSTM cell 470 can be generated from a LSTM cell used in neural networks; an example of a modified LSTM cell is provided herein with reference to FIG. 4D. The modified LSTM cell 470 receives as input the spatial aggregation $\bar{x}_{n,t}$ (EQ. 9) as well as the hidden state signal $h_{t-1}$ and the cell state signal $c_{t-1}$ from the feature dimension calibration slice of a preceding slice (t−1) to generate an updated hidden state signal $h_t$ and an updated cell state signal $c_t$.

Figure 4D:
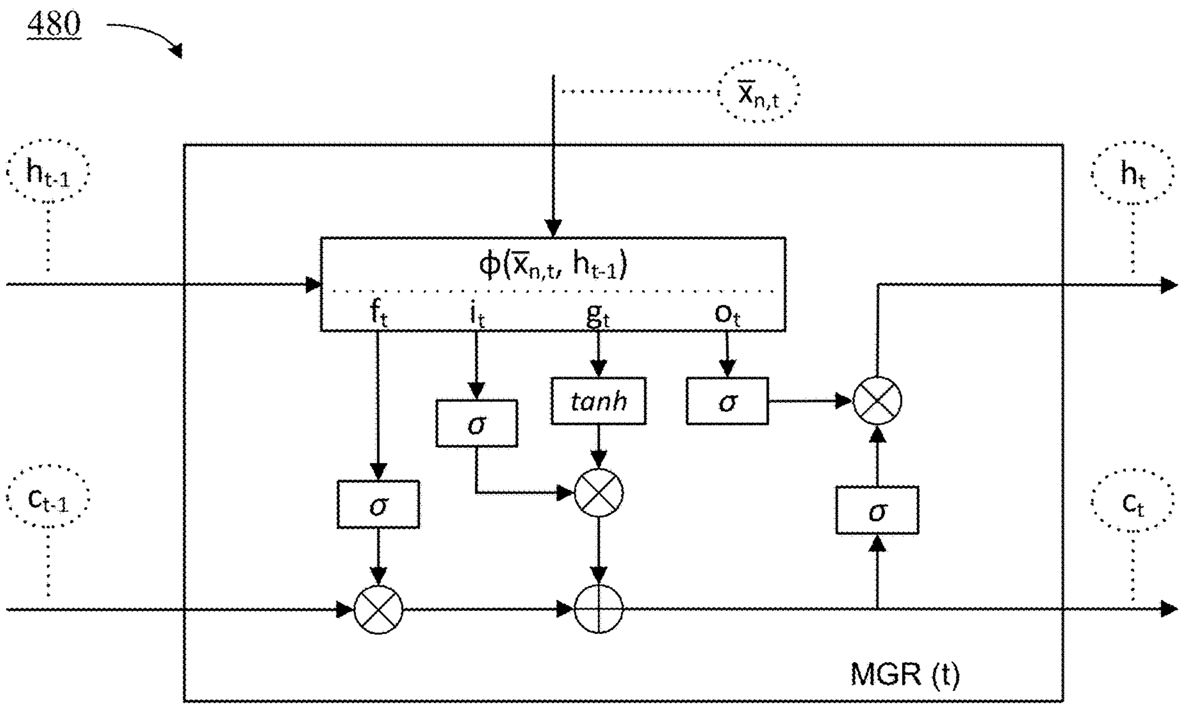

FIG. 4D provides a diagram illustrating an example of a MGR unit 480 for a feature dimension calibration slice according to one or more embodiments, with reference to components and features described herein including but not limited to the figures and associated description. The MGR unit 480 can correspond to the second MGR unit 454 (FIG. 4B, already discussed) and/or to the MGR unit 460 (FIG. 4C, already discussed). In particular, the MGR unit 480 comprises an example of a modified LSTM cell, such as the modified LSTM cell 470 (FIG. 4C, already discussed). The MGR unit 480 provides a gating mechanism that can be denoted by:

$$(f_t, i_t, g_t, o_t) = \phi([\bar{x}_t, h_{t-1}]) + b \quad \text{EQ. (13)}$$

where ϕ(•) is a bottleneck unit for processing the spatial aggregation $\bar{x}_{n,t}$ (EQ. 9) and the hidden state signal $h_{t-1}$ from the preceding feature dimension calibration slice (t−1), and b is a bias. For example, the bottleneck unit ϕ(•) can be a contraction-expansion bottleneck unit having a fully connected (FC) layer which maps the input to a low dimensional space with the reduction ratio r, a ReLU activation layer, and another FC layer which maps the input back to the original dimensional space. In some embodiments, the bottleneck unit ϕ(•) can be implemented as any form of linear or nonlinear mapping. The dynamically-generated parameters $f_t$, $i_t$, $g_t$, $o_t$ form a set of gates to regularize the update of the cell state signal $c_t$ and the hidden state signal $h_t$ of the MGR unit 480 for slice (t) as follows:

$$c_t = \sigma(f_t) \odot c_{t-1} + \sigma(i_t) \odot \tanh(g_t) \quad \text{EQ. (14)}$$

and $$h_t = \sigma(o_t) \odot \sigma(c_t) \quad \text{EQ. (15)}$$

where $c_t$ is the updated cell state signal, $h_t$ is the updated hidden state signal, $c_{t-1}$ is the cell state signal from the preceding slice (t−1), σ(•) is the sigmoid function, and ⊙ is the Hadamard product operator.

Some or all components and features of the MGR unit 460 and/or the MGR unit 480 can be implemented using one or more of a CPU, a GPU, an AI accelerator, an FPGA accelerator, an ASIC, and/or via a processor with software, or in a combination of a processor with software and an FPGA or ASIC. More particularly, components and features of the MGR unit 460 and/or the MGR unit 480 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The neural network structures and/or the network depth calibration layer(s) and the feature dimension calibration layer(s) described herein (e.g., FIGS. 2A-2D, FIGS. 3A-3D and 4A-4D) can be applied to any existing 3D CNN interleavingly (e.g., as shown in FIGS. 2A-2D), thus augmenting the capacity of 3D CNN models.

Figure 5A:
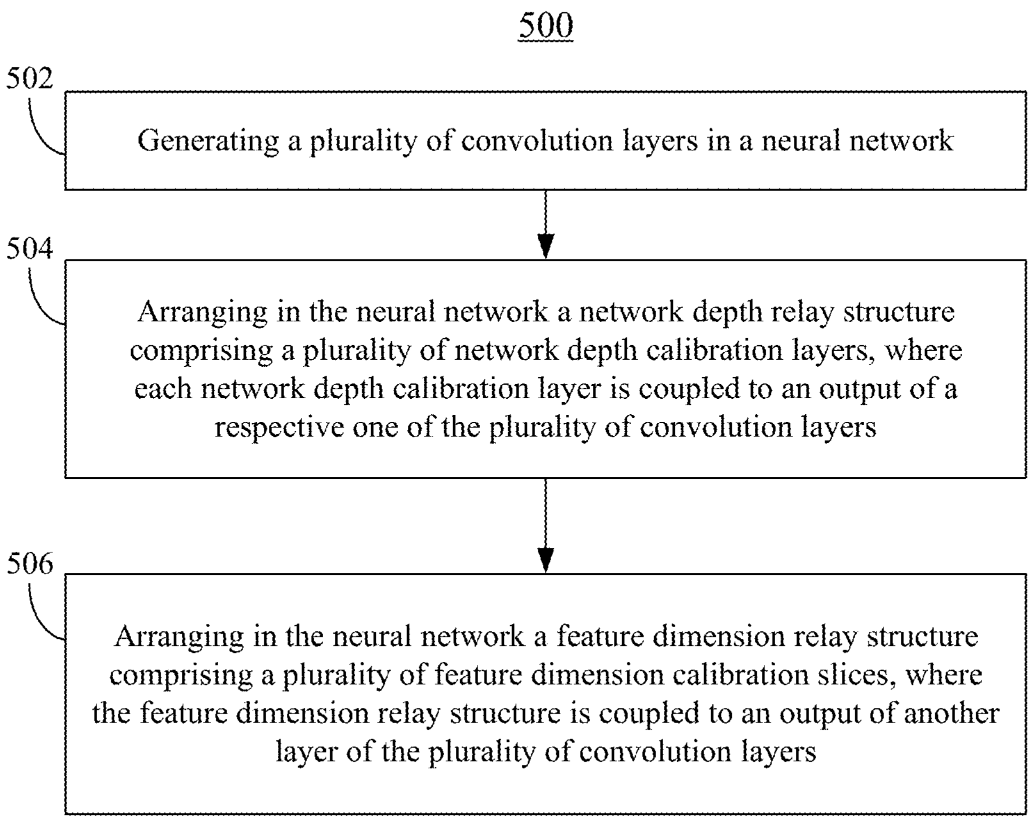
FIGS. 5A-5B are flowcharts illustrating an example of a method of constructing a neural network according to one or more embodiments.

FIG. 5A is a flowchart illustrating a method 500 of constructing a neural network according to one or more embodiments, with reference to components and features described herein including but not limited to the figures and associated description. The method 500 can be employed, e.g., in constructing the neural network 110 (FIGS. 1A-1B, already discussed), and/or the neural network structure 200 (FIGS. 2A-2D, already discussed), and can utilize the network depth calibration structure 300 (FIG. 3A, already discussed), the feature dimension calibration structure 400

(FIG. 4A, already discussed), and/or any components thereof (FIGS. 3A-3D, already discussed, or FIGS. 4A-4D, already discussed). The method 500 can generally be implemented in the system 100 (FIGS. 1A-1B, already discussed), and/or using one or more of a CPU, a GPU, an AI accelerator, an FPGA accelerator, an ASIC, and/or via a processor with software, or in a combination of a processor with software and an FPGA or ASIC. More particularly, the method 500 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 provides for generating a plurality of convolution layers in a neural network. Illustrated processing block 504 provides for arranging in the neural network a network depth relay structure comprising a plurality of network depth calibration layers, where each network depth calibration layer is coupled to an output of a respective one of the plurality of convolution layers. Illustrated processing block 506 provides for arranging in the neural network a feature dimension relay structure comprising a plurality of feature dimension calibration slices, where the feature dimension relay structure is coupled to an output of another layer of the plurality of convolution layers.

Figure 5B:
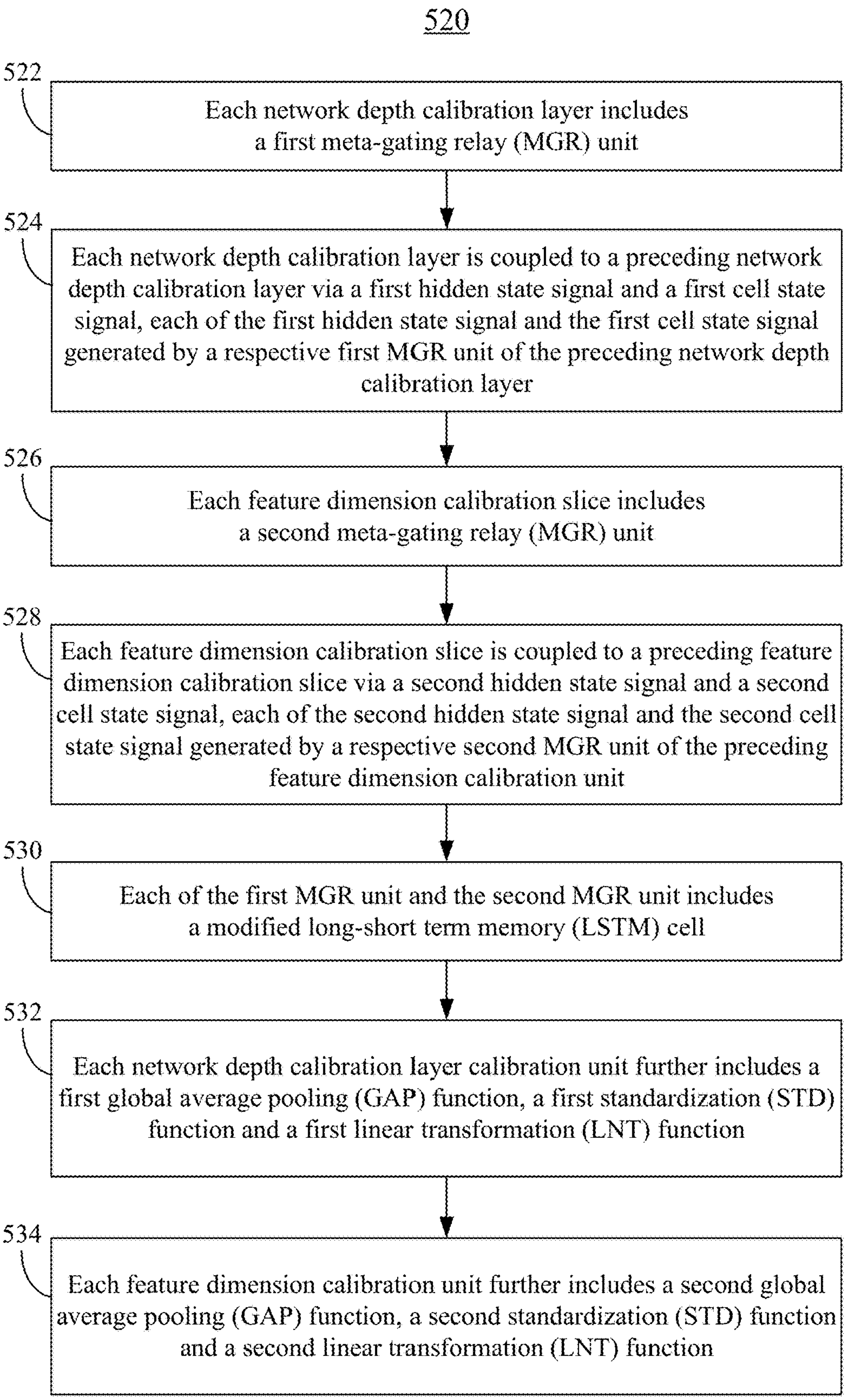

FIG. 5B is a flowchart illustrating a method 520 of constructing a neural network according to one or more embodiments, with reference to components and features described herein including but not limited to the figures and associated description. The method 520 can be employed, e.g., in constructing the neural network 110 (FIGS. 1A-1B, already discussed), and/or the neural network structure 200 (FIGS. 2A-2D, already discussed), and can utilize the network depth calibration structure 300 (FIG. 3A, already discussed), the feature dimension calibration structure 400 (FIG. 4A, already discussed), and/or any components thereof (FIGS. 3A-3D, already discussed, or FIGS. 4A-4D, already discussed). The method 520 can generally be implemented in the system 100 (FIGS. 1A-1B, already discussed), and/or using one or more of a CPU, a GPU, an AI accelerator, an FPGA accelerator, an ASIC, and/or via a processor with software, or in a combination of a processor with software and an FPGA or ASIC. More particularly, the method 520 can be implemented in one or more modules as a set of logic instructions stored in a non-transitory machine- or computer-readable storage medium such as RAM, read only memory ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

At illustrated processing block 522, each network depth calibration layer includes a first meta-gating relay (MGR) unit, where at illustrated processing block 524 each network depth calibration layer is coupled to a preceding network depth calibration layer via a first hidden state signal and a first cell state signal, each of the first hidden state signal and the first cell state signal generated by a respective first MGR unit of the preceding network depth calibration layer. Illustrated processing block 524 can generally be substituted for at least a portion of illustrated processing block 504.

At illustrated processing block 526, each feature dimension calibration slice includes a second meta-gating relay (MGR) unit, where at illustrated processing block 528 each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit. Illustrated processing block 528 can generally be substituted for at least a portion of illustrated processing block 506.

At illustrated processing block 530, each of the first MGR unit and the second MGR unit includes a modified long-short term memory (LSTM) cell. In some embodiments, the modified LSTM cell can include a gating mechanism employing a bottleneck unit.

At illustrated processing block 532, each network depth calibration layer calibration unit further includes a first global average pooling (GAP) function, a first standardization (STD) function and a first linear transformation (LNT) function. The first GAP function is operative on a feature map, the first STD function is operative on the feature map, and the first LNT function is operative on an output of the first STD function, where the first LNT function is based on the first hidden state signal generated by the first MGR unit and on the first cell state signal generated by the first MGR unit.

At illustrated processing block 534, each feature dimension calibration unit further includes a second GAP function, a second STD function and a second LNT function. The second GAP function is operative on a feature slice, the second STD function is operative on the feature slice, and the second LNT function is operative on an output of the second STD function, where the second LNT function is based on the second hidden state signal generated by the second MGR unit and on the second cell state signal generated by the second MGR unit.

Thus, the disclosed technology provides for a combination of the network depth relay structure and the feature dimension relay structure that serves to associate the 3D feature distribution dependencies both along the temporal dimension and along network depth (e.g., between neighboring layers or blocks). By employing the neural network technology as described herein with reference to FIGS. 1A-1B, 2A-2D, 3A-3D, 4A-4D, and 5A-5B, the MGR structure is integrated with meta-learning such that the hidden state $h_k$ and the cell state $c_k$ are set as the scale and shift parameters for calibrating the $k^{th}$ block video feature tensor $x_k$ (along network depth), and the hidden state $h_t$ and the cell state $c_t$ are set as the scale and shift parameters for calibrating the feature slice of the $t^{th}$ input slice $x_{n,t}$ (along temporal dimension). By using the network depth relay structure, the feature dimension relay structure, and gating mechanisms of the respective MGR units, the calibration parameters for the $k^{th}$ layer feature map and the $t^{th}$-frame feature slice can be conditioned on not only the current input feature map $x_k$ and current input feature slice $x_{n,t}$, but also on the estimated calibration parameters $c_{k-1}$ and $h_{k-1}$ for the preceding (k−1) layer and the estimated calibration parameters $c_{t-1}$ and $h_{t-1}$ for the preceding (t−1) feature slice. Further, the neural network technology as described herein leverages observed feature distributions to guide the learning dynamic of the current feature calibration layer. Intermediate feature distributions are implicitly interdependent as a whole system, and with the shared MGR units in the disclosed SA-FCAA technology, these potential conditions are extracted for learning of calibration parameters. Moreover, the disclosed technology explicitly exploits the feature correlation across layers and along the temporal dimension, and generates calibration parameters associated in a selfadaptive relay fashion for each individual video sample, both in training and inference. The parameters can be optimized simultaneously together with those of the main network in a backward pass since their computation flow is completely differentiable.

Figure 6A:
FIGS. 6A-6F are illustrations of example input image sequences and corresponding activation maps in a system for image sequence/video analysis according to one or more embodiments.
Figure 6B:
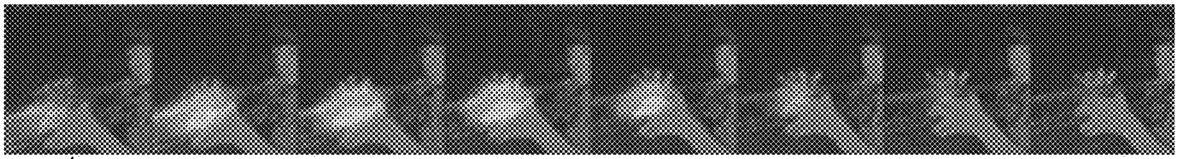
Figure 6C:
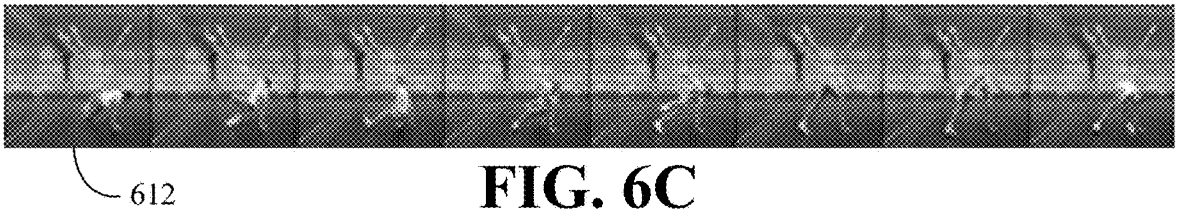
Figure 6D:
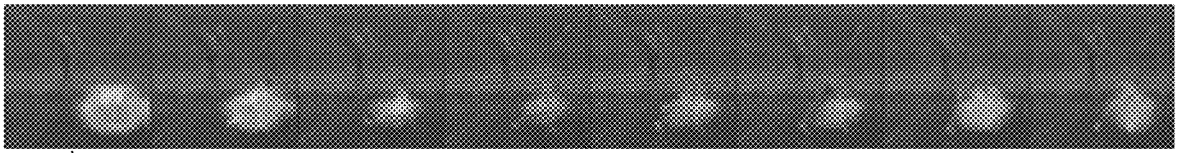
Figure 6E:
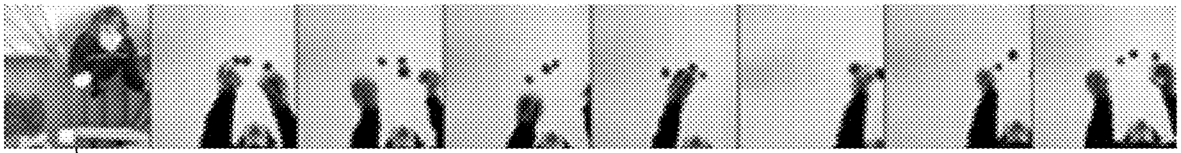
Figure 6F:
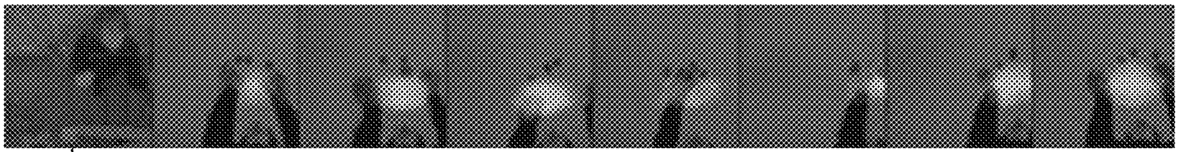

FIGS. 6A-6F provide illustrations of example input image sequences and corresponding activation maps in a system for image sequence/video analysis according to one or more embodiments, with reference to components and features described herein including but not limited to the figures and associated description. The input image sequences (shown in FIGS. 6A, 6C, and 6E as images converted to grayscale) were obtained from sample image sequences in the Kinetics-200 dataset. While each input sequence in FIGS. 6A, 6C, and 6E is shown with eight frames, the input sequences used included video clips having thirty-two frames. The activation maps (shown in FIGS. 6B, 6D, and 6F as stacked on the respective input images from FIGS. 6A, 6C, and 6E and converted to grayscale) were generated by processing the input image sequences using an example of the neural network technology described herein. FIG. 6A provides an example of an input image sequence of trumpet playing, as shown at label 602. FIG. 6B provides a set of activation maps as shown at label 604, each activation map shown stacked on and corresponding to one of the input images of FIG. 6A. FIG. 6C provides an example of an input image sequence of breakdancing, as shown at label 612. FIG. 6D provides a set of activation maps as shown at label 614, each activation map shown stacked on and corresponding to one of the input images of FIG. 6C. FIG. 6E provides an example of an input image sequence of juggling balls, as shown at label 622. FIG. 6F provides a set of activation maps as shown at label 624, each activation map shown stacked on and corresponding to one of the input images of FIG. 6E.

The bright areas of each activation map as shown in FIGS. 6B, 6D, and 6F show the areas identified by the neural network as areas of motion, with identified regions of motion during the sequence highlighted. As demonstrated by each set of examples, the neural network technology described herein provides for consistent emphasis of holistic motion-related attentional regions within an image sequence or video clip with high confidence precision. The disclosed technology thus can be used to augment spatiotemporal feature learning for 3D CNNs and provides critical improvement of image sequence/video representation learning for high-performance image sequence/video analysis tasks.

Figure 7:
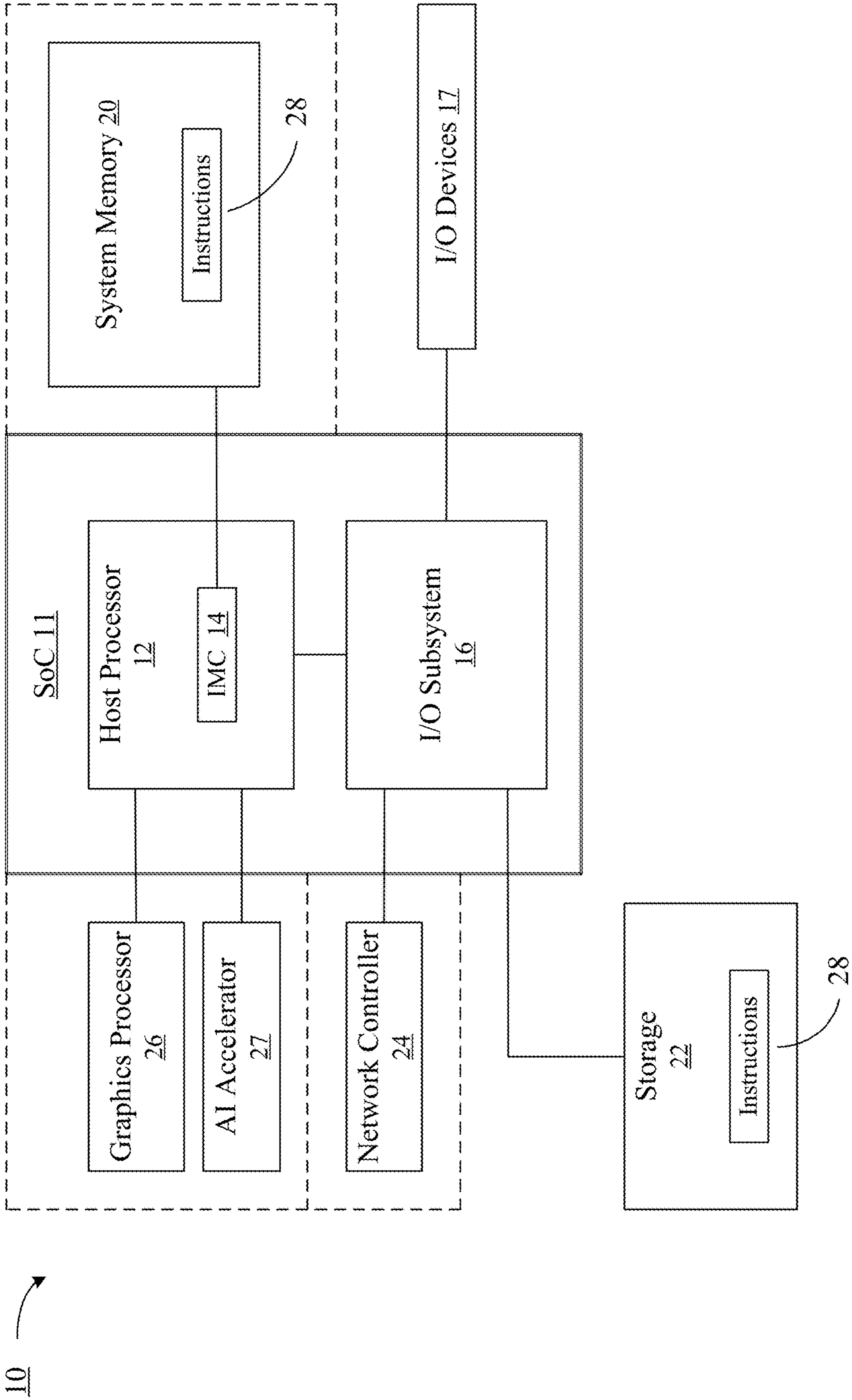
FIG. 7 is a block diagram illustrating an example of a computing system for image sequence/video analysis according to one or more embodiments.

FIG. 7 shows a block diagram illustrating an example computing system 10 for image sequence/video analysis according to one or more embodiments, with reference to components and features described herein including but not limited to the figures and associated description. The system 10 can generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 can include a host processor 12 (e.g., central processing unit/CPU) having an integrated memory controller (IMC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) subsystem 16. The I/O subsystem 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/or the I/O subsystem 16 can communicate with the storage 22 (all or portions thereof) via a network controller 24. In some embodiments, the system 10 can also include a graphics processor 26 (e.g., a graphics processing unit/GPU) and an AI accelerator 27. In an embodiment, the system 10 can also include a vision processing unit (VPU), not shown.

The host processor 12 and the I/O subsystem 16 can be implemented together on a semiconductor die as a system on chip (SoC) 11, shown encased in a solid line. The SoC 11 can therefore operate as a computing apparatus for image sequence/video analysis. In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O subsystem 16 can execute program instructions 28 retrieved from the system memory 20 and/or the storage 22 to perform one or more aspects of process 500 and/or process 520 as described herein with reference to FIGS. 5A-5B. The system 10 can implement one or more aspects of the system 100, the neural network 110, the neural network structure 200, the network depth calibration structure 300, the network depth relay structure 310, the network depth calibration layer 350, the MGR unit 360, the MGR unit 380, the feature dimension calibration structure 400, the feature dimension relay structure 410, the feature dimension calibration slice 450, the MGR unit 460, and/or the MGR unit 480 as described herein with reference to FIGS. 1A-1B, 2A-2D, 3A-3D, and 4A-4D. The system 10 is therefore considered to be performance-enhanced at least to the extent that the technology provides the ability to consistently identify motion-related attentional regions within an image sequence/video.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

I/O devices 17 can include one or more of input devices, such as a touch-screen, keyboard, mouse, cursor-control device, touch-screen, microphone, digital camera, video recorder, camcorder, biometric scanners and/or sensors; input devices can be used to enter information and interact with system 10 and/or with other devices. The I/O devices 17 can also include one or more of output devices, such as a display (e.g., touch screen, liquid crystal display/LCD, light emitting diode/LED display, plasma panels, etc.), speakers and/or other visual or audio output devices. The input and/or output devices can be used, e.g., to provide a user interface.

Figure 8:
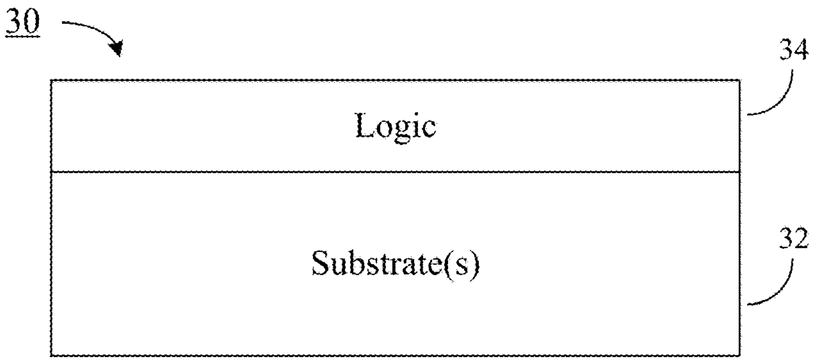
FIG. 8 is a block diagram illustrating an example of a semiconductor apparatus according to one or more embodiments.

FIG. 8 shows a block diagram illustrating an example semiconductor apparatus 30 for image sequence/video analysis according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 7. The logic 34 can implement one or more aspects of the processes described above, including process 500 and/or process 520. The logic 34 can implement one or more aspects the system 100, the neural network 110, the neural network structure 200, the network depth calibration structure 300, the network depth relay structure 310, the network depth calibration layer 350, the MGR unit 360, the MGR unit 380, the feature dimension calibration structure 400, the feature dimension relay structure 410, the feature dimension calibration slice 450, the MGR unit 460, and/or the MGR unit 480 as described herein with reference to FIGS. 1A-1B, 2A-2D, 3A-3D, and 4A-4D. The apparatus 30 is therefore considered to be performance-enhanced at least to the extent that the technology provides the ability to consistently identify motion-related attentional regions within an image sequence/video.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 may not be an abrupt junction. The logic 34 can also be considered to include an epitaxial layer that is grown on an initial wafer of the substrate(s) 34.

Figure 9:
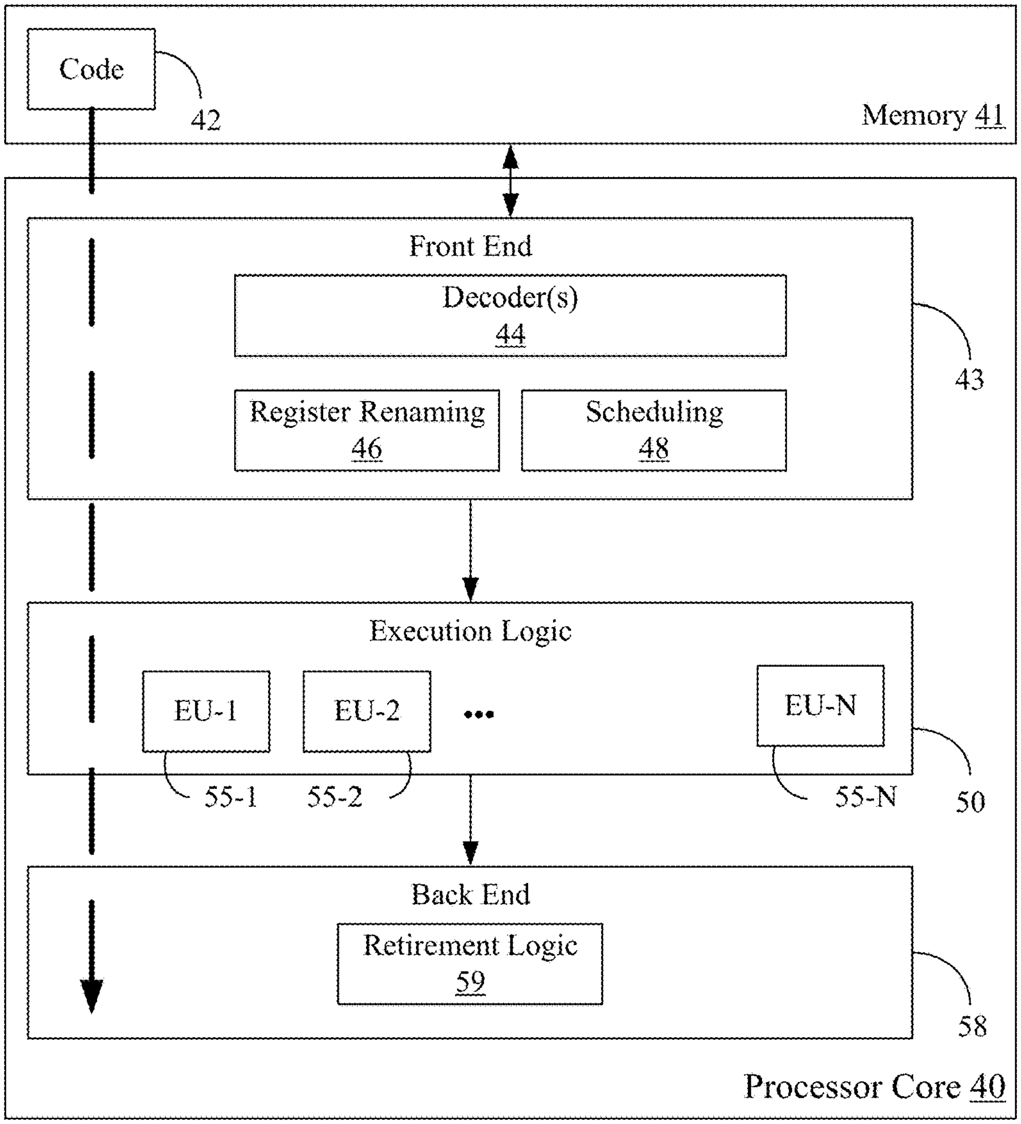
FIG. 9 is a block diagram illustrating an example of a processor according to one or more embodiments.

FIG. 9 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 9, a processing element can alternatively include more than one of the processor core 40 illustrated in FIG. 9. The processor core 40 can be a single-threaded core or, for at least one embodiment, the processor core 40 can be multithreaded in that it can include more than one hardware thread context (or "logical processor") per core.

FIG. 9 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the processes 500 and/or 520 described above. The processor core 40 can implement one or more aspects of the system 100, the neural network 110, the neural network structure 200, the network depth calibration structure 300, the network depth relay structure 310, the network depth calibration layer 350, the MGR unit 360, the MGR unit 380, the feature dimension calibration structure 400, the feature dimension relay structure 410, the feature dimension calibration slice 450, the MGR unit 460, and/or the MGR unit 480 as described herein with reference to FIGS. 1A-1B, 2A-2D, 3A-3D, and 4A-4D. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 9, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

Figure 10:
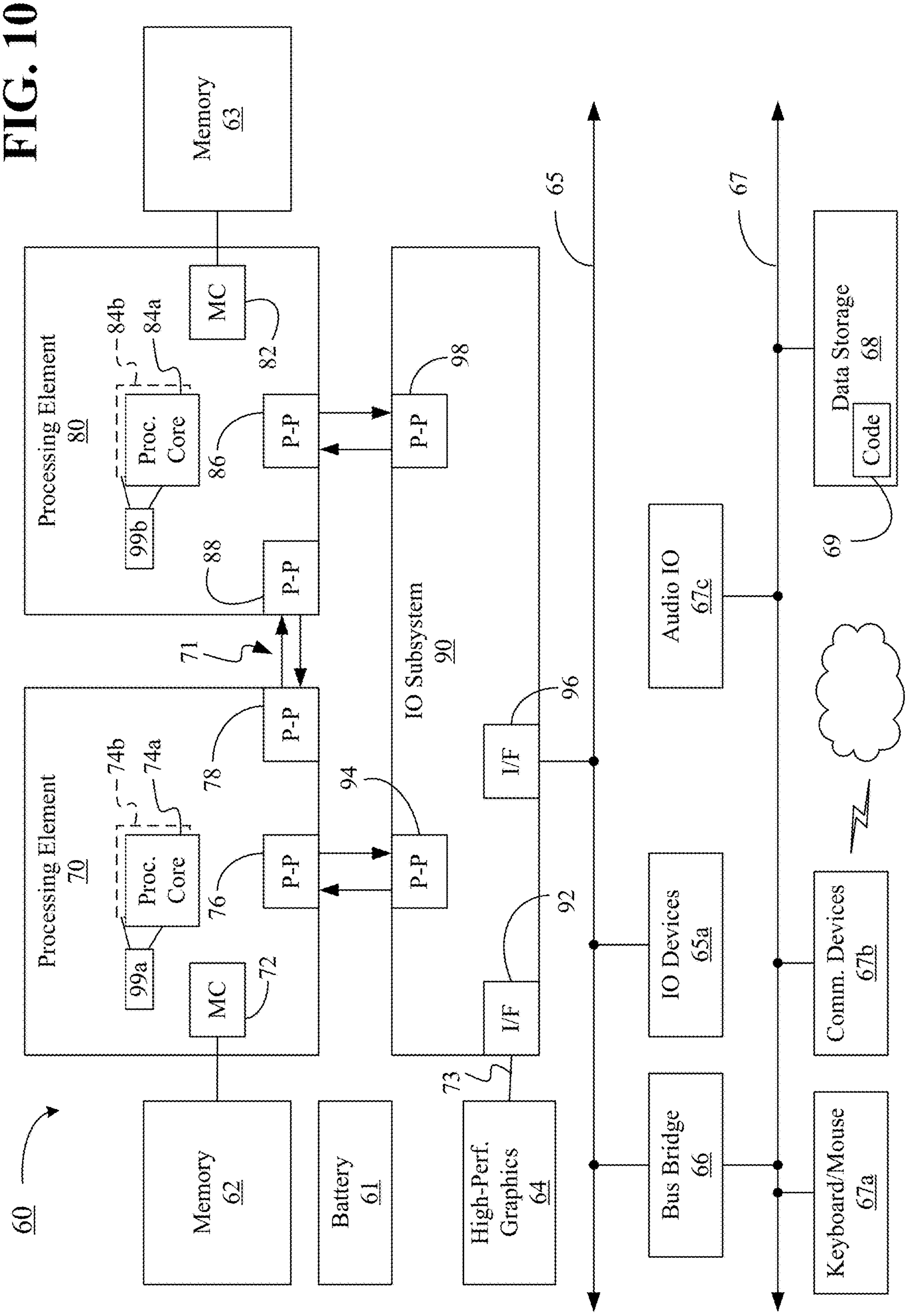
FIG. 10 is a block diagram illustrating an example of a multiprocessor-based computing system according to one or more embodiments.

FIG. 10 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 10 can be implemented as a multi-drop bus rather than point-to-point interconnect.

As shown in FIG. 10, each of the processing elements 70 and 80 can be multicore processors, including first and second processor cores (i.e., processor cores 74*a* and 74*b* and processor cores 84*a* and 84*b*). Such cores 74*a*, 74*b*, 84*a*, 84*b* can be configured to execute instruction code in a manner similar to that discussed above in connection with FIG. 9.

Each processing element 70, 80 can include at least one shared cache 99*a*, 99*b*. The shared cache 99*a*, 99*b* can store data (e.g., instructions) that are utilized by one or more components of the processor, such as the cores 74*a*, 74*b* and 84*a*, 84*b*, respectively. For example, the shared cache 99*a*, 99*b* can locally cache data stored in a memory 62, 63 for faster access by components of the processor. In one or more embodiments, the shared cache 99*a*, 99*b* can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 10, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 10, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 10, various I/O devices 65*a* (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67*a*, communication device(s) 67*b*, and a data storage unit 68 such as a disk drive or other mass storage device which can include code 69, in one embodiment. The illustrated code 69 can implement one or more aspects of the processes described above, including process 500 and/or process 520. The illustrated code 69 can be similar to the code 42 (FIG. 9), already discussed. Further, an audio I/O 67*c* can be coupled to second bus 67 and a battery 61 can supply power to the computing system 60. The system 60 can implement one or more aspects of the system 100, the neural network 110, the neural network structure 200, the network depth calibration structure 300, the network depth relay structure 310, the network depth calibration layer 350, the MGR unit 360, the MGR unit 380, the feature dimension calibration structure 400, the feature dimension relay structure 410, the feature dimension calibration slice 450, the MGR unit 460, and/or the MGR unit 480 as described herein with reference to FIGS. 1A-1B, 2A-2D, 3A-3D, and 4A-4D.

Note that other embodiments are contemplated. For example, instead of the point-to-point architecture of FIG. 10, a system can implement a multi-drop bus or another such communication topology. Also, the elements of FIG. 10 can alternatively be partitioned using more or fewer integrated chips than shown in FIG. 10.

Embodiments of each of the above systems, devices, components and/or methods, including the system 100, the neural network 110, the neural network structure 200, the network depth calibration structure 300, the network depth relay structure 310, the network depth calibration layer 350, the MGR unit 360, the MGR unit 380, the feature dimension calibration structure 400, the feature dimension relay structure 410, the feature dimension calibration slice 450, the MGR unit 460, the MGR unit 480, the process 500, and/or the process 520, and/or any other system components, can be implemented in hardware, software, or any suitable combination thereof. For example, hardware implementations can include configurable logic such as, for example, PLAs, FPGAs, CPLDs, or fixed-functionality logic hardware using circuit technology such as, for example, ASIC, CMOS or TTL technology, or any combination thereof.

Alternatively, or additionally, all or portions of the foregoing systems and/or components and/or methods can be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a computing system, comprising a processor, and a memory coupled to the processor, the memory storing a neural network, the neural network comprising a plurality of convolution layers, a network depth relay structure comprising a plurality of network depth calibration layers, wherein each network depth calibration layer is coupled to an output of a respective one of the plurality of convolution layers, and a feature dimension relay structure comprising a plurality of feature dimension calibration slices, wherein the feature dimension relay structure is coupled to an output of another layer of the plurality of convolution layers.

Example 2 includes the computing system of Example 1, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

Example 3 includes the computing system of Example 2, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

Example 4 includes the computing system of Example 3, wherein each of the first MGR unit and the second MGR unit comprises a modified long-short term memory (LSTM) cell.

Example 5 includes the computing system of Example 4, wherein each network depth calibration layer further comprises a first global average pooling (GAP) function operative on a feature map, a first standardization (STD) function operative on the feature map, and a first linear transformation (LNT) function operative on an output of the first STD function, the first LNT function based on the first hidden state signal generated by the first MGR unit and on the first cell state signal generated by the first MGR unit, and wherein each feature dimension calibration slice further comprises a second GAP function operative on a feature slice, a second STD function operative on the feature slice, and a second LNT function operative on an output of the second STD function, the second LNT function based on the second hidden state signal generated by the second MGR unit and on the second cell state signal generated by the second MGR unit.

Example 6 includes the computing system of any one of Examples 1-5, wherein the feature dimension relay structure associates calibrated features along a temporal dimension.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates comprising a neural network, the neural network comprising a plurality of convolution layers, a network depth relay structure comprising a plurality of network depth calibration layers, wherein each network depth calibration layer is coupled to an output of a respective one of the plurality of convolution layers, and a feature dimension relay structure comprising a plurality of feature dimension calibration slices, wherein the feature dimension relay structure is coupled to an output of another layer of the plurality of convolution layers.

Example 8 includes the apparatus of Example 7, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

Example 9 includes the apparatus of Example 8, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

Example 10 includes the apparatus of Example 9, wherein each of the first MGR unit and the second MGR unit comprises a modified long-short term memory (LSTM) cell.

Example 11 includes the apparatus of Example 10, wherein each network depth calibration layer further comprises a first global average pooling (GAP) function operative on a feature map, a first standardization (STD) function operative on the feature map, and a first linear transformation (LNT) function operative on an output of the first STD function, the first LNT function based on the first hidden state signal generated by the first MGR unit and on the first cell state signal generated by the first MGR unit, and wherein each feature dimension calibration slice further comprises a second GAP function operative on a feature slice, a second STD function operative on the feature slice, and a second LNT function operative on an output of the second STD function, the second LNT function based on the second hidden state signal generated by the second MGR unit and on the second cell state signal generated by the second MGR unit.

Example 12 includes the apparatus of any one of Examples 7-11, wherein the feature dimension relay structure associates calibrated features along a temporal dimension.

Example 13 includes the apparatus of Example 7, wherein the logic coupled to the one or more substrates includes transistor channel regions that are positioned within the one or more substrates.

Example 14 includes at least one computer readable storage medium comprising a set of instructions which, when executed by a computing system, cause the computing system to generate a plurality of convolution layers in a neural network, arrange in the neural network a network depth relay structure comprising a plurality of network depth calibration layers, wherein each network depth calibration layer is coupled to an output of a respective one of the plurality of convolution layers, and arrange in the neural network a feature dimension relay structure comprising a plurality of feature dimension calibration slices, wherein the feature dimension relay structure is coupled to an output of another layer of the plurality of convolution layers.

Example 15 includes the at least one computer readable storage medium of Example 14, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

Example 16 includes the at least one computer readable storage medium of Example 15, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

Example 17 includes the at least one computer readable storage medium of Example 16, wherein each of the first MGR unit and the second MGR unit comprises a modified long-short term memory (LSTM) cell.

Example 18 includes the at least one computer readable storage medium of Example 17, wherein each network depth calibration layer further comprises a first global average pooling (GAP) function operative on a feature map, a first standardization (STD) function operative on the feature map, and a first linear transformation (LNT) function operative on an output of the first STD function, the first LNT function based on the first hidden state signal generated by the first MGR unit and on the first cell state signal generated by the first MGR unit, and wherein each feature dimension calibration slice further comprises a second GAP function operative on a feature slice, a second STD function operative on the feature slice, and a second LNT function operative on an output of the second STD function, the second LNT function based on the second hidden state signal generated by the second MGR unit and on the second cell state signal generated by the second MGR unit.

Example 19 includes the at least one computer readable storage medium of any one of Examples 14-18, wherein the feature dimension relay structure associates calibrated features along a temporal dimension.

Example 20 includes a method comprising generating a plurality of convolution layers in a neural network, arranging in the neural network a network depth relay structure comprising a plurality of network depth calibration layers, wherein each network depth calibration layer is coupled to an output of a respective one of the plurality of convolution layers, and arranging in the neural network a feature dimension relay structure comprising a plurality of feature dimension calibration slices, wherein the feature dimension relay structure is coupled to an output of another layer of the plurality of convolution layers.

Example 21 includes the method of Example 20, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

Example 22 includes the method of Example 21, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

Example 23 includes the method of Example 22, wherein each of the first MGR unit and the second MGR unit comprises a modified long-short term memory (LSTM) cell.

Example 24 includes the method of Example 23, wherein each network depth calibration layer further comprises a first global average pooling (GAP) function operative on a feature map, a first standardization (STD) function operative on the feature map, and a first linear transformation (LNT) function operative on an output of the first STD function, the first LNT function based on the first hidden state signal generated by the first MGR unit and on the first cell state signal generated by the first MGR unit, and wherein each feature dimension calibration slice further comprises a second GAP function operative on a feature slice, a second STD function operative on the feature slice, and a second LNT function operative on an output of the second STD function, the second LNT function based on the second hidden state signal generated by the second MGR unit and on the second cell state signal generated by the second MGR unit.

Example 25 includes the method of any one of Examples 20-24, wherein the feature dimension relay structure associates calibrated features along a temporal dimension.

Example 26 includes an apparatus comprising means for performing the method of any one of claims 20-24.

Thus, technology described herein improves the performance of computing systems used in image sequence/video analysis tasks, both as to significant speed-up in training and in improvement in accuracy. The technology described herein may be applicable in any number of computing scenarios, including, e.g., deployment of deep video models on edge/cloud devices and in high-performance distributed/parallel computing systems.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system for image sequence or video analysis, comprising:

a processor; and a memory coupled to the processor, the memory storing a neural network, the neural network comprising:

a plurality of convolution layers;

a network depth relay structure comprising a plurality of network depth calibration layers, wherein each network depth calibration layer is coupled to an output of a respective one of the plurality of convolution layers; and a feature dimension relay structure comprising a plurality of feature dimension calibration slices, wherein the feature dimension relay structure is coupled to an output of another layer of the plurality of convolution layers.

2. The computing system of claim 1, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

3. The computing system of claim 2, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

4. The computing system of claim 3, wherein each of the first MGR unit and the second MGR unit comprises a modified long-short term memory (LSTM) cell.

5. The computing system of claim 4, wherein each network depth calibration layer further comprises:

a first global average pooling (GAP) function operative on a feature map;

a first standardization (STD) function operative on the feature map; and a first linear transformation (LNT) function operative on an output of the first STD function, the first LNT function based on the first hidden state signal generated by the first MGR unit and on the first cell state signal generated by the first MGR unit; and wherein each feature dimension calibration slice further comprises:

a second GAP function operative on a feature slice;

a second STD function operative on the feature slice; and a second LNT function operative on an output of the second STD function, the second LNT function based on the second hidden state signal generated by the second MGR unit and on the second cell state signal generated by the second MGR unit.

6. The computing system of claim 1, wherein the feature dimension relay structure associates calibrated features along a temporal dimension.

7. A semiconductor apparatus for image sequence or video analysis, comprising:

one or more substrates; and logic coupled to the one or more substrates, wherein the logic is implemented at least partly in one or more of configurable logic or fixed-functionality hardware logic, the logic coupled to the one or more substrates comprising a neural network, the neural network comprising:

a plurality of convolution layers;

a network depth relay structure comprising a plurality of network depth calibration layers, wherein each network depth calibration layer is coupled to an output of a respective one of the plurality of convolution layers; and a feature dimension relay structure comprising a plurality of feature dimension calibration slices, wherein the feature dimension relay structure is coupled to an output of another layer of the plurality of convolution layers.

8. The apparatus of claim 7, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

9. The apparatus of claim 8, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

10. The apparatus of claim 9, wherein each of the first MGR unit and the second MGR unit comprises a modified long-short term memory (LSTM) cell.

11. The apparatus of claim 10, wherein each network depth calibration layer further comprises:

a first global average pooling (GAP) function operative on a feature map;

a first standardization (STD) function operative on the feature map; and a first linear transformation (LNT) function operative on an output of the first STD function, the first LNT function based on the first hidden state signal generated by the first MGR unit and on the first cell state signal generated by the first MGR unit; and wherein each feature dimension calibration slice further comprises:

a second GAP function operative on a feature slice;

a second STD function operative on the feature slice; and a second LNT function operative on an output of the second STD function, the second LNT function based on the second hidden state signal generated by the second MGR unit and on the second cell state signal generated by the second MGR unit.

12. The apparatus of claim 7, wherein the feature dimension relay structure associates calibrated features along a temporal dimension.

13. The apparatus of claim 7, wherein the logic coupled to the one or more substrates includes transistor channel regions that are positioned within the one or more substrates.

14. At least one non-transitory computer readable storage medium comprising a set of instructions for image sequence or video analysis which, when executed by a computing system, cause the computing system to:

generate a plurality of convolution layers in a neural network;

arrange in the neural network a network depth relay structure comprising a plurality of network depth calibration layers, wherein each network depth calibration layer is coupled to an output of a respective one of the plurality of convolution layers; and arrange in the neural network a feature dimension relay structure comprising a plurality of feature dimension calibration slices, wherein the feature dimension relay structure is coupled to an output of another layer of the plurality of convolution layers.

15. The at least one non-transitory computer readable storage medium of claim 14, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

16. The at least one non-transitory computer readable storage medium of claim 15, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

17. The at least one non-transitory computer readable storage medium of claim 16, wherein each of the first MGR unit and the second MGR unit comprises a modified long-short term memory (LSTM) cell.

18. The at least one non-transitory computer readable storage medium of claim 17, wherein each network depth calibration layer further comprises:

a first global average pooling (GAP) function operative on a feature map;

a first standardization (STD) function operative on the feature map; and a first linear transformation (LNT) function operative on an output of the first STD function, the first LNT function based on the first hidden state signal generated by the first MGR unit and on the first cell state signal generated by the first MGR unit; and wherein each feature dimension calibration slice further comprises:

a second GAP function operative on a feature slice;

a second STD function operative on the feature slice; and a second LNT function operative on an output of the second STD function, the second LNT function based on the second hidden state signal generated by the second MGR unit and on the second cell state signal generated by the second MGR unit.

19. The at least one non-transitory computer readable storage medium of claim 14, wherein the feature dimension relay structure associates calibrated features along a temporal dimension.

20. A method for image sequence or video analysis, comprising:

generating a plurality of convolution layers in a neural network;

arranging in the neural network a network depth relay structure comprising a plurality of network depth calibration layers, wherein each network depth calibration layer is coupled to an output of a respective one of the plurality of convolution layers; and arranging in the neural network a feature dimension relay structure comprising a plurality of feature dimension calibration slices, wherein the feature dimension relay structure is coupled to an output of another layer of the plurality of convolution layers.

21. The method of claim 20, wherein each network depth calibration layer comprises a first meta-gating relay (MGR) unit, and wherein each network depth calibration layer is coupled to a preceding network depth calibration layer via a first hidden state signal and a first cell state signal, each of the first hidden state signal and the first cell state signal generated by a respective first MGR unit of the preceding network depth calibration layer.

22. The method of claim 21, wherein each feature dimension calibration slice comprises a second meta-gating relay (MGR) unit, and wherein each feature dimension calibration slice is coupled to a preceding feature dimension calibration slice via a second hidden state signal and a second cell state signal, each of the second hidden state signal and the second cell state signal generated by a respective second MGR unit of the preceding feature dimension calibration unit.

23. The method of claim 22, wherein each of the first MGR unit and the second MGR unit comprises a modified long-short term memory (LSTM) cell.

24. The method of claim 23, wherein each network depth calibration layer further comprises:

a first global average pooling (GAP) function operative on a feature map;

a first standardization (STD) function operative on the feature map; and a first linear transformation (LNT) function operative on an output of the first STD function, the first LNT function based on the first hidden state signal generated by the first MGR unit and on the first cell state signal generated by the first MGR unit; and wherein each feature dimension calibration slice further comprises:

a second GAP function operative on a feature slice;

a second STD function operative on the feature slice; and a second LNT function operative on an output of the second STD function, the second LNT function based on the second hidden state signal generated by the second MGR unit and on the second cell state signal generated by the second MGR unit.

25. The method of claim 20, wherein the feature dimension relay structure associates calibrated features along a temporal dimension.

* * * * *